United States Patent [19]

Kabat et al.

[11] 4,429,299

[45] Jan. 31, 1984

[54] TWO-WAY AC POWER LINE COMMUNICATIONS SYSTEM

[75] Inventors: Jules M. Kabat; James H. Beggs, both of Las Vegas, Nev.

[73] Assignee: Robertshaw Controls Company, Richmond, Va.

[21] Appl. No.: 228,608

[22] Filed: Jan. 26, 1981

Related U.S. Application Data

[63] Continuation of Ser. No. 992, Jan. 5, 1979, abandoned.

[51] Int. Cl.³ ............................................. H04B 3/54
[52] U.S. Cl. ............................ 340/310 R; 340/310 A; 340/538; 340/825.52
[58] Field of Search ................ 340/310 R, 310 A, 505, 340/310 CP, 538, 870.01, 825.26, 825.52, 870.02, 870.03; 364/200, 900; 307/3, 140; 455/282, 352

[56] References Cited

U.S. PATENT DOCUMENTS

| | | | |
|---|---|---|---|
| 3,733,586 | 5/1973 | Lusk et al. | 340/310 R |
| 3,810,096 | 5/1974 | Kabat et al. | 340/310 CP |
| 4,012,734 | 3/1977 | Jagoda et al. | 340/310 A |
| 4,057,793 | 11/1977 | Johnson et al. | 340/310 R |
| 4,101,834 | 7/1978 | Stutt et al. | 340/310 A |
| 4,132,981 | 1/1979 | White | 340/151 |
| 4,312,903 | 1/1982 | Molari, Jr. | 428/442 |

*Primary Examiner*—James J. Groody
*Attorney, Agent, or Firm*—Kokjer, Kircher, Bradley, Wharton, Bowman & Johnson

[57] ABSTRACT

An AC power line communications system includes means for transmitting data to and receiving data from a plurality of transceivers over a conventional AC power distribution network. A central procession unit is provided to poll a plurality of room control units which are placed in each room or designated area of a hotel, hospital or building complex. The central processing unit conducts this polling sequence by periodically transmitting, over the neutral and ground lines of the power distribution network, and interrogation signal having an address portion and a data portion. Each room control unit is arranged to receive the interrogation signal and to compare the address portion of this signal with an address previously programmed into the unit. If the address portion of the interrogation signal corresponds with the programmed address of the room control unit, the unit transmits a return signal to the central processing unit. The room control units uses the data portion of the interrogation signal to report a number of different features of functions within the room (or area) in which the room control unit is located. A sequence of successive, identical addresses is used to allow the room control unit to accept data from the central processor. The central processing unit processes the data contained in the return signal insuring that the data received by the room control unit coincides wih the data transmitted to it by the central processing unit and permitting a record of the data accumulated by the room control unit to be made.

This AC power line communications system is well suited to be used in combination with a room status indicating system to monitor the status of each room in buildings such as a hotel, motel, or hospital complex, to monitor the condition of a smoke detector located in each room of the complex, to remotely control the operation of the heating and cooling equipment in each room of the complex, to convey message-waiting information to each room in the complex and to perform an automatic wake-up operation.

35 Claims, 15 Drawing Figures

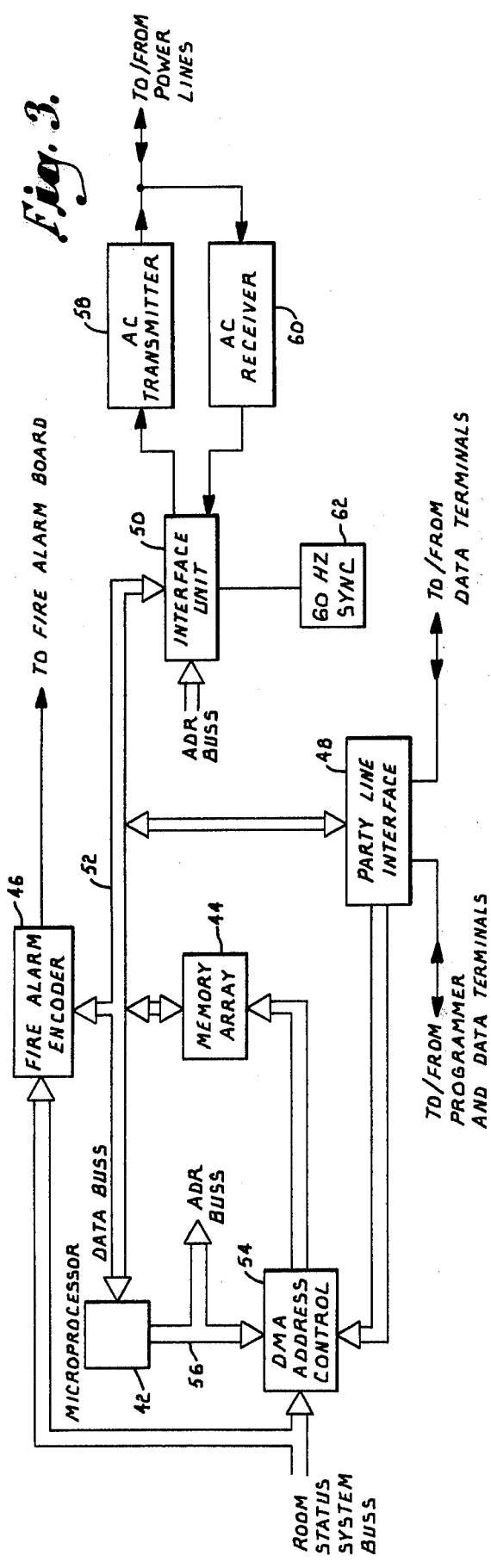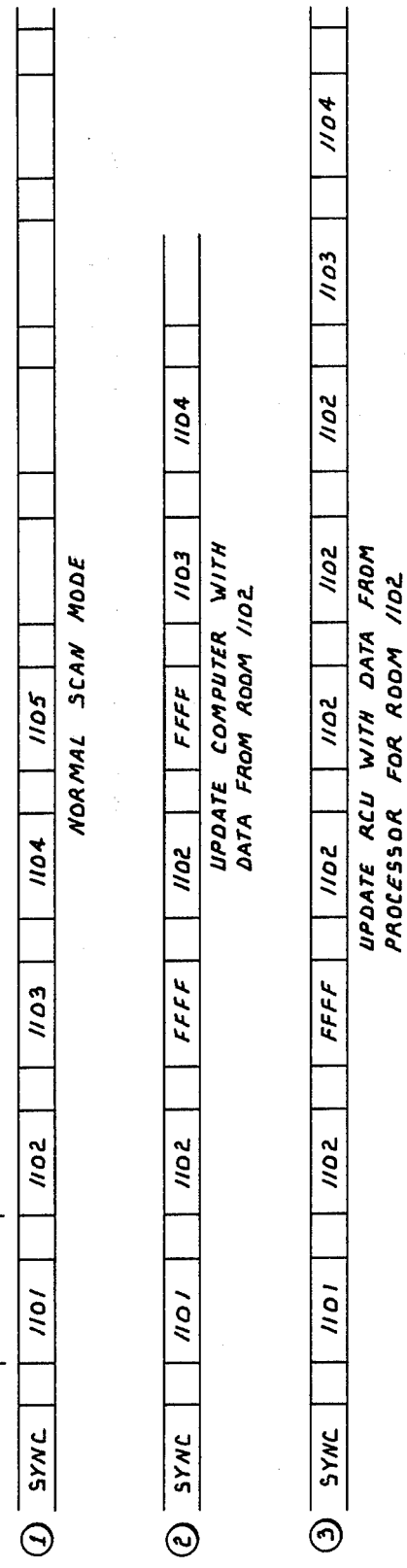

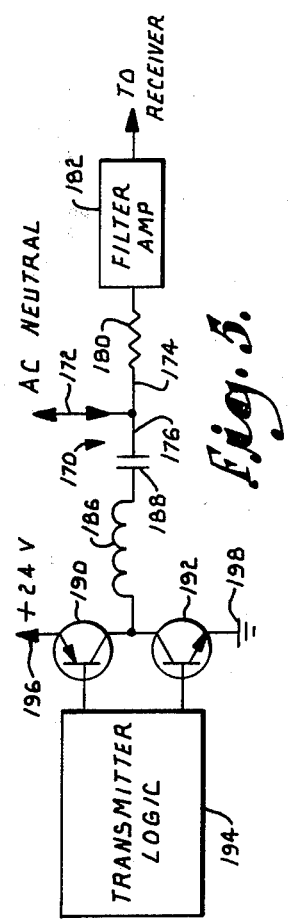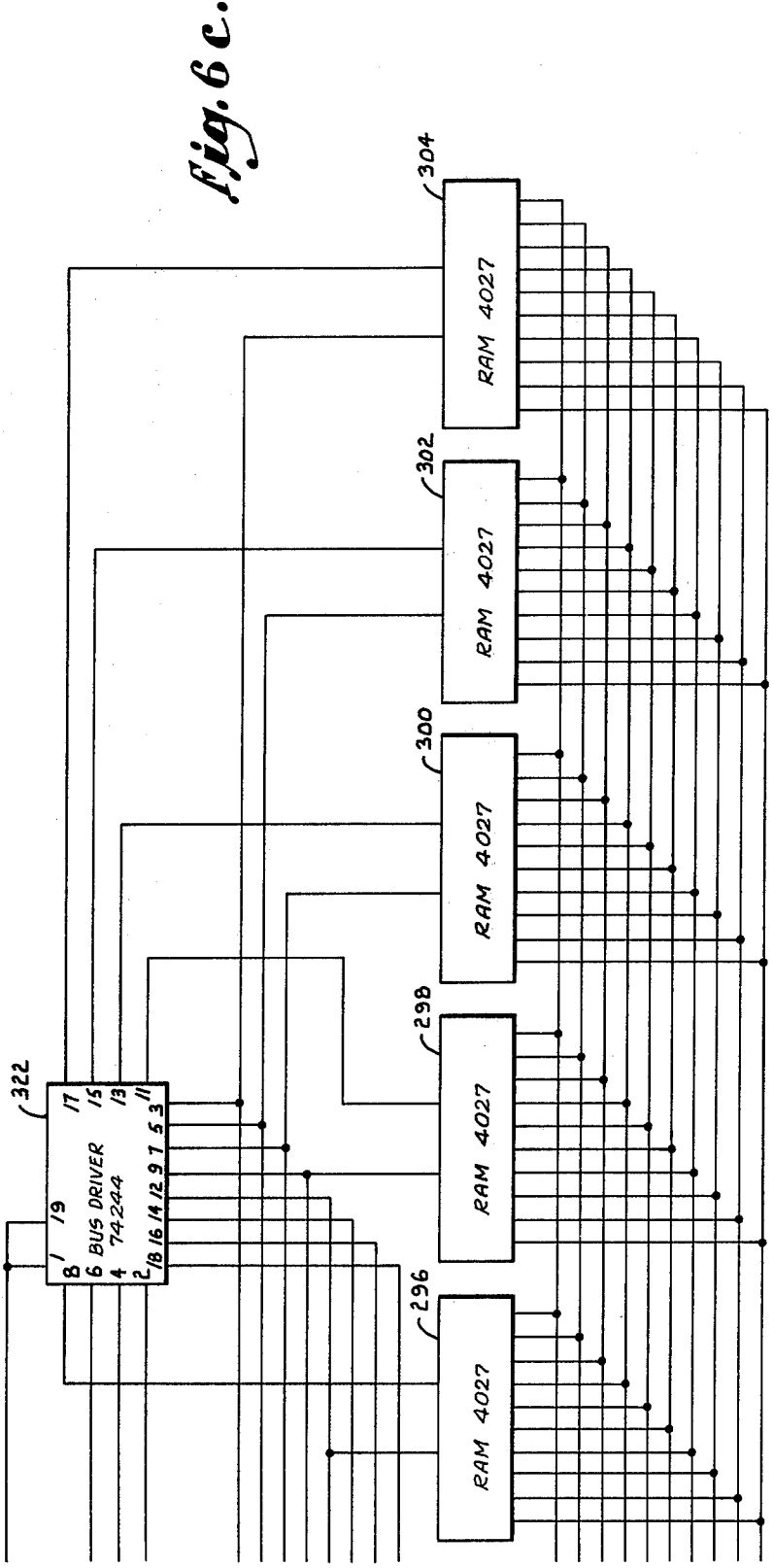

TWO-WAY AC POWER LINE COMMUNICATIONS SYSTEM

This is a continuation of application Ser. No. 000,992, filed Jan. 5, 1979, now abandoned.

BACKGROUND AND BRIEF DESCRIPTION OF THE INVENTION

This invention relates in general to a two-way AC power line communications system which utilizes the neutral and ground lines in an existing electrical power distribution network as the transmission medium. In particular, this AC power line communications system is operable to transmit data to and receive data from each room or designated area in a building or building complex over the existing AC power lines. The AC power line communications system described herein is well suited to be used in combination with a conventional room status indicating system to periodically transmit to and receive from each room or designated area of buildings such as a hotel, motel or hospital complex information which describes the status of each room in the complex, controls the operation of various equipment in each room of the complex, monitors various parameters or features of each room in the complex and initiates various service functions within each room of the complex.

In buildings such as a large hotel, motel, hospital or nursing home complex, a significant number of man-hours is spent each day monitoring the status of the rooms in the complex and in performing other routine monitoring and service functions. For example in a hotel/motel complex, these routine functions include determining which of the occupied rooms have been vacated and distributing this information to the cashier, front desk and cleaning staff. Additional routine tasks which are commonly performed by the hotel/motel staff include coordinating housekeeping services to maintain a current listing of the occupied rooms, the empty rooms which have already been cleaned, and the rooms which are not available for service due to maintenance reasons. In most hotels and motels, the hotel/motel staff also performs a message-waiting service to indicate to guests that an undelivered message is waiting for them at the front desk and wake-up services for altering a guest at a particular time.

In a hospital and/or nursing home complex, a considerable amount of time is spent each day in gathering and processing room status information. The problem of monitoring patient location is another time consuming task which is routinely performed by the staff of the hospital. Another monitoring function which is typically performed by the hospital staff is that of informing the kitchen as to the number and type of the meals to be prepared. Finally, the handling and transmission of messages and other emergency information to the staff of the hospital is now manually conducted by a member of the staff.

An existing room status indicating system, which is capable of performing several of the above mentioned functions more efficiently, is given and described in the patent to Kabat et al., U.S. Pat. No. 3,810,096, issued May 7, 1974, which is incorporated by reference herein.

This room status indicating system is capable of transmitting digitally encoded information from a remote transmitter to a central line receiver over the neutral and ground lines of the AC power distribution network in a building or building complex. The transmitter includes a retractable power cord for coupling the transmitter with the AC power distribution network and mechanical switches for physically programming data into the transmitter, the power cord is placed into any wall outlet and a "push to transmit" button on the transmitter is depressed. The transmitter data is received by the central line receiver which operates in conjunction with a special purpose computer to decode the received data and to update the information stored in the memory of the computer in response to the content of this data. This system also includes a number of peripheral data terminals which are operable to pass information to and from the special purpose computer of the system and a status display board which provides a visual indication of the status of each room. While this system presents a significant advance over the prior art, it still lacks the desirable feature of being able to conduct from a central location two-way communications with each room or designated area in the hotel, motel or hospital complex.

The two-way AC power line communications system of the present invention is compatible with the room status indicating system described in U.S. Pat. No. 3,810,096 or with a general purpose computer to provide an improved room status indicating system which is capable of not only receiving data central location information from a remote transmitter but also of selectively transmitting from the central location information to a remote transceiver placed in each room or designated area of the building complex.

The two-way AC power line communications system of the present invention is basically comprised of a central processing unit and a plurality of room control units which are placed in each room or designated area in the building complex. The central processing unit acts as a central information depository and is provided with a memory unit for storing a room list and data pertaining to each room on the list. The central processing unit is also capable of selectively communicating with each room control unit and of processing the data received from these room control units. The central processing unit initiates communication with a particular room control unit by generating and transmitting over the power distribution network an address code corresponding to the unit to be contacted. The central processing unit is also capable of receiving information from peripheral data terminals associated with the system and of providing data to a particular data terminal in response to a request for information from that terminal. Finally, the central processing unit is electrically coupled with a status display board to initiate display of the stored data pertaining to each room of the complex.

The room control units, on the other hand, act as transceivers which are capable of carrying on two-way communications with the central processing unit over the AC power lines associated with the building or the building complex. Each room control unit is equipped with circuitry for receiving from the central processing unit an interrogation signal comprised of an address and data code. The room control units are also equipped with circuitry for comparing the address portion of the received interrogation signal with a preselected address code programmed into the unit. A room control unit responds to the reception of an interrogation signal having an address code representative of that room control unit by transmitting to the central processing unit a return signal containing data accumulated by the room control unit from external sources and data previously provided to the room control unit from the central processing unit.

Placement of a room control unit in each room of a hotel, motel or hospital complex creates a number of operating problems not encountered in the prior art. The large number of room control units requires that data from the room control units be provided to the central processing unit in an orderly and disciplined manner. If the room control units were allowed to transmit data to the central processing unit in a random manner, it is highly probable, given the large number of room control units, that two or more of these units would be transmitting data simultaneously. The simultaneous transmission of data by two or more room control units would impede the proper operation of the system because these signals would interfere with each other making all of the data received by the central processing unit completely unintelligible. To overcome this problem, the AC power line communications system of the present invention sequentially polls each of the room control units. In other words, the central processing unit contacts and receives data from each of the room control units sequentially to prevent two room control units from simultaneously transmitting data to the central processing unit.

The placement of a plurality of room control units on a single communications line also presents a line loading and/or "suck-out" problem which is not present in the prior art because conventional room status indicating systems only engage in one-way communication. Each of the room control units of the present invention acts as a receiver which dissipates a portion of the transmitted signal. The amount by which the transmitted signal is dissipated is directly related to the number of room control units connected to the communications line. For example, as the number of room control units increases, the amount of signal dissipation increases proportionally. If this loading problem (and/or suck-out) is not properly controlled, the strength of the transmitted signal may be dissipated to the point where the receiving unit is not capable of recognizing the signal. It has been found, that signal dissipation can be significantly reduced by providing each room control unit with a high input impedance. The room control unit, however, should be coupled with the AC power line by means of a low impedance whenever it is transmitting. To fulfill both of these operating requirements, the room control unit includes a unique transmitter which is coupled with the neutral line of the power distribution network through one of a three branch coupling network. The second branch of this network is connected directly to the neutral line of the AC distribution network while the third branch of this network is electrically coupled with the receiver of the room control unit through a high impedance circuit element and a filter and amplifier network. The subject invention is capable of reliably transmitting and receiving digital information even though an excess of 50 or more rooms or areas (locations of the room central unit) be used.

The transmitter is comprised of a tri-state switching device which is comprised of two switching transistors and associated control logic. These switching transistors are arranged to present a high input impedance if the transmitter is not transmitting and to provide a low impedance whenever the transmitter is transmitting. In particular, these transistors are maintained in a cut-off state if the transmitter is not active and are capable of alternately connecting their branch of the three branch coupling network to one or two different sources of voltage in response to an alternating control signal provided to the base terminal of these transistors from the transmitter logic. Through this switching action, the tri-state switching device is capable of introducing a large level signal onto the AC neutral line which acts as a frequency modulator. As a result, this device is capable of assuming one of three different operating states in response to other control signal from the transmitter logic. These three operating states include a high voltage state, a lower voltage state, and a cut-off state wherein the tri-state switching device introduces a high input impedance between the AC neutral line and the transmitter of the room control unit.

The nature of the operating environment and the functions being controlled by this system require that an error-type checking routine be incorporated into the design of the system to ensure that the control functions are properly activated upon command and are not inadvertently activated by a noisy signal. During the polling sequence performed by the system, the central processing unit transmits an interrogation signal comprised of an address code. Upon receiving an interrogation signal containing its address code, a room control unit transmits to the central processing unit a return signal consisting of data previously received by the room control unit from the central processing unit and the data accumulated by the room control unit from external sources. Upon receiving this return signal, the central processing unit compares the received data with the data stored within its associated memory. If the receiver data coincides with the stored data, the central processing unit continues its polling operation by contacting another room control unit. A discrepancy, however, causes the central processing unit to poll that room control unit for a second time.

Upon receiving a second return signal from the same room control unit, the central processing unit compares the data contained in this signal with the data stored in its associated memory. If this data coincides, the central processing unit assumes that the difference between the stored data and the data received during the first return signal was caused by noise on the communication line. The central processing unit then continues its polling operation by contacting the next room control unit. A discrepancy however, between the data contained in the second return signal and the stored data causes the central processing unit to compare the data contained in the second return signal with the data transmitted to the central processing unit by the first return signal. If this data coincides, the central processing unit assumes that the difference between the stored data and the data received within the first and secnd return signals is the result of new information rather than noise on the communications line. The central processing unit then makes a rigid comparison between the data contained within the first and second return signals and the data stored in its associated memory to determine where the difference lies.

If the above difference resides in the data accumulated by the room control unit from the external sources, the data stored within the memory associated with the central processing unit is simply updated and the polling operation of the central processing unit is continued. If, on the other hand, the difference in the stored and received data resides in the data initially transferred by the central processing unit to the room control unit, the central processing unit addresses this room control unit for a third time. Upon being contacted by the central processing unit for the third time, the room control unit is placed in condition to receive new data from the central processing unit. After the room control unit enters this condition, the central processing unit contacts the room control unit for a fourth time. The room control unit responds to this fourth transmission by returning the newly received data to the central processing unit. The central processing unit then compares this data with the data stored within its memory. If the received data coincides with the stored data, the central processing unit contacts the room control unit for a final time. The room control unit responds to this transmission by causing the data received during the fourth transmission to be stored in a storage register associated with this room control unit. The room control also transmits a return signal to the central processing unit. This return signal is comprised of the newly stored data from the central processing unit and of the data accumulated by the room control unit from the various external sources. The central processing unit uses this fifth return signal to confirm reception and storage of the new data within the room control unit. Upon making this determination, the central processing unit continues to the next room on its list. In this way, the AC power line communications system of the present invention incorporates an error-type checking routine which ensures that the data stored within the room control unit coincides with the data stored within the memory associated with central processing unit.

The central processing unit is also operable to monitor the operating condition of each room control unit. If a room control unit continuously responds with incorrect data or does not respond at all, the central processing unit indicates that this room control unit is out of order and continues on with its polling sequence.

The unique two-way communications feature of this AC power line communications system adds several new operating features to the conventional room status indicating system described in the U.S. patent to Kabat et al., Ser. No. 3,810,096. The AC power lines communication system of the present invention is capable of selectively transmitting an interrogation signal composed of eight independent bits of information to each of the room control units and of receiving from each room control unit an eight bit return signal composed of four independent bits of information pertaining to data accumulated by the unit from external sources and four bits of information pertaining to data stored in the room control unit in response to data previously transmitted to the room control unit by the central processing unit. As a result, a conventional room status indicating system incorporating this AC power line communications system is capable of performing not only all of the functions normally associated with room status indicating systems but also several new functions which were previously unavailable. In particular, this system is capable of gathering within a central processing unit status information from each of the room control units and of providing information to each of the room control units from the central processing unit in response to information introduced into the system at the peripheral data terminals. It is contemplated that two of the eight bits of the return signal from the room control units will be utilized to represent the status of the room. For example, one of these bits is to be used to indicate that the room has been cleaned as a stay-over while the other bit is to be used to indicate that the room has been cleaned as an occupied room. Another of the information bits in the return signal is to be used to monitor the condition of a smoke detector located in the room. Activation of the smoke detector in response to a fire causes the data bit corresponding to this feature to assume a state representative of an alarm condition. Upon becoming aware of this alarm condition, the central processing unit activates a light on a display board next to the number of the room indicating to the hotel staff that the smoke detector in that room has been activated. The fourth bit of information is to be used to represent some sort of activity which is capable of producing a switch closure type of action. Some of the activities presently contemplated include activation of an in-room movie or a pay TV program. The other four bits of the return signal comprise information previously provided to the room control unit from the control processing unit.

Some of the new operating features which are made possible by the two-way communications feature of this invention include the ability to remotely control the operation of the heating and air conditioning equipment in a particular room, the ability to convey message-waiting information to an indicator in the room and the ability to provide an automatic wake-up system operable to alert the guest in a particular room at a preselected time.

It is therefore an object of the present invention to provide an AC power line communications system which is capable of conducting two-way communications between a central processing unit and a plurality of room control units over the AC power lines in a building or building complex.

A further object of the present invention to provide an AC power line communications system which is capable of conducting two-way communications between a central processing unit and a plurality of room control units over the AC power lines within a building or building complex wherein the system is capable of being quickly and efficiently installed in schools, hotels, motels, hospitals, office buildings and apartment complexes because it utilizes the existing power lines within the building or building complex as the communication link between the central processing unit and all of the room control units.

Another object of the present invention is to provide an AC power line communications system which is capable of conducting two-way communications between a central processing unit and a plurality of room (or point) control units tover the AC power lines in a building or building complex wherein the central processing unit is capable of sequentially polling each room control unit of the system to thereby provide and receive information from each room control unit in a disciplined and orderly manner.

A further object of the present invention is to provide an AC power line communications system which is capable of conducting two-way communications between a central processing unit and a plurality of room (or point) control units over the neutral and ground lines of the AC power distribution network in a building or building complex.

An additional object of the present invention is to provide an AC power line communications system which is capable of conducting two-way communications between a central processing unit and a plurality of room (or point) control units over the AC power lines in a building or building complex wherein each room control unit is arranged to respond to a particular address code by first accepting digital data from the central processing unit and then transmitting digital data back to the central processing unit.

Another object of the present invention is to provide an AC power line communications system which is capable of conducting two-way communications between a central processing unit and a plurality of room control units over the AC power lines in a building or building complex wherein each room control unit is arranged to present a high input impedance to the transmitted signal to thereby lessen the line loading and/or "suck-out" effect produced by the placement of a plurality of room control units on the same communications line.

An additional object of the present invention is to provide an AC power line communications system which is capable of conducting two-way communications between a central processing unit and a plurality of room control units over the AC power lines in a building or building complex wherein the transmitter of each room control unit is comprised of a tri-state switching device which is capable of presenting a high impedance to the neutral line of the distribution network when the transmitter is not transmitting and of providing a low impedance whenever the transmitter is active.

It is a further object of the present invention to provide an AC power line communication system which is capable of conducting two-way communications between a central processing unit and a plurality of room control units over the AC power lines in a building or building complex wherein the system is compatible with a room status indicating system to perform various operating or service functions within each room of a hotel, motel, schools or hospital complex and to monitor the status or condition of each of these rooms.

It is a further object of the present invention to provide an AC power line communications system which is capable of conducting two-way communications between a central processing unit and a plurality of room control units over the AC power lines in a building or building complex wherein the system is compatible with a room status indicating system to monitor the status of each room in a hotel, motel or hospital complex in order to coordinate the housekeeping activities conducted by the hotel, motel or hospital staff and to provide an up-to-date record of the status of each room.

It is another object of the present invention to provide an AC power line communication system which is capable of conducting two-way communications between a central processing unit and a plurality of room control units wherein the system is compatible with a room status indicating system to perform an energy conserving function by remotely controlling the operation of the heating and cooling equipment within each room of a hotel, schools, motel or hospital complex.

It is an additional object of the present to provide an AC power line communications system which is capable of conducting two-way communications between a central processing unit and a plurality of room control units over the AC power line in a building or building complex wherein the system is compatible with room status indicating system to activate a message-waiting indicator within a particular room of a hotel, motel or hospital complex when the guest occupying that room has an undelivered message at the front desk of the hotel, motel or hospital complex.

An additional object of the present invention is to provide an AC power line communications system which is capable of conducting two-way communications between a central processing unit and a plurality of room control units over the AC power lines in a building or building complex wherein the system is compatible with a room status indicating system to remotely monitor the condition of a smoke detector placed in each room of a hotel, motel or hospital complex and to provide a visual indication of the condition of each detector.

It is another object of the present invention to provide an AC power line communications system which is capable of conducting two-way communications between a central processing unit and a plurality of room control units over the AC power lines in a building or building complex wherein the system is compatible with a room status indicating system to selectively convey a wake-up signal to any room within the hotel, motel or hospital complex.

A further object is to provide a data rate based on the 6th harmonic of a power distribution system of a hotel, motel, schools or hospital complex, said data rate being capable of use in any AC power line communication system.

A further object is to provide, in a system of the character described, a unique device which reduces the time for polling rooms and/or remote control units throughout the entire system.

Other and further objects of this invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 3 is a block diagram of the transceiver unit of the AC power line communications system of the present invention;

FIG. 5 is a more detailed diagram of the AC transmitter employed in the room control unit of the present invention;

Figure 6A:
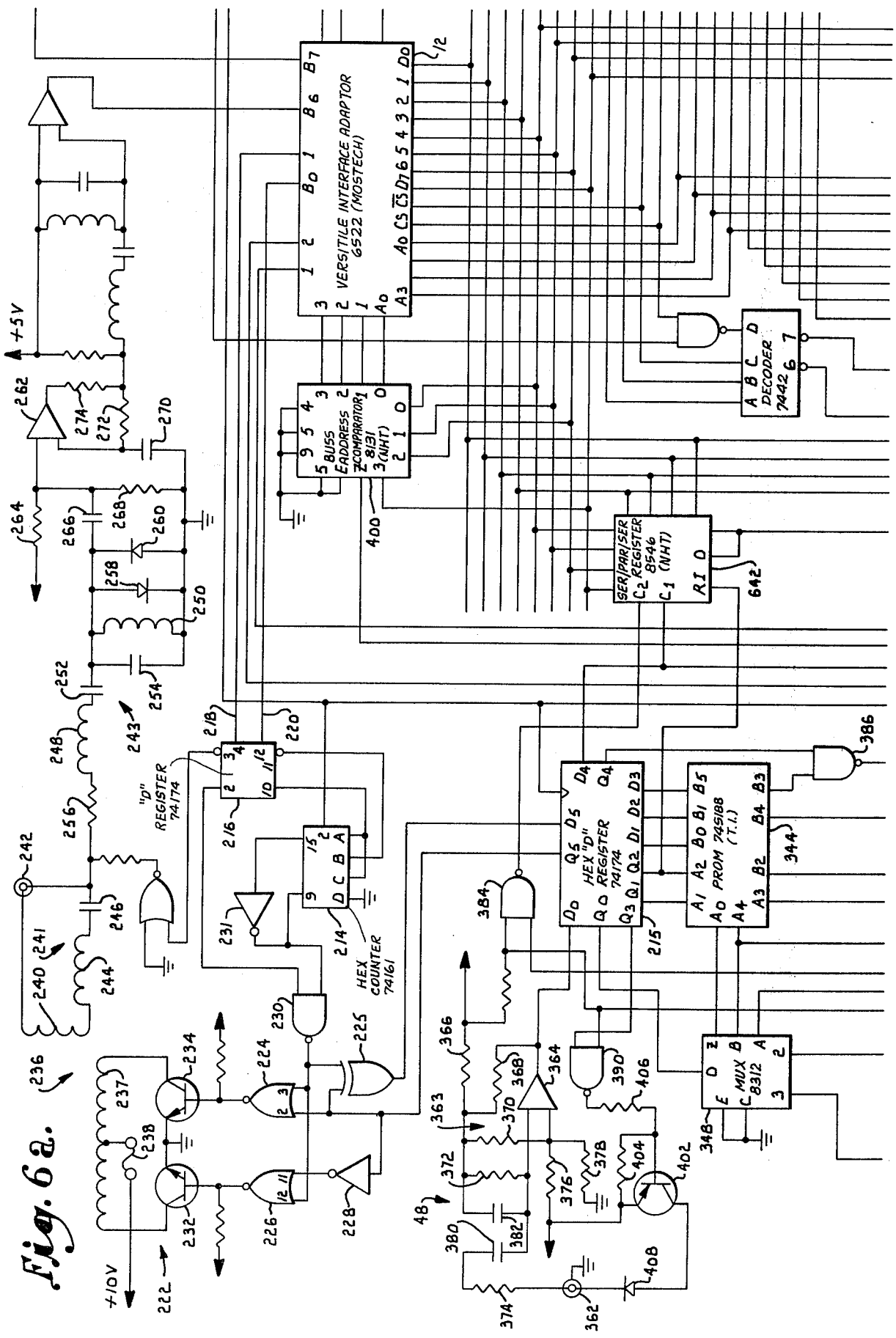
Figure 6B:
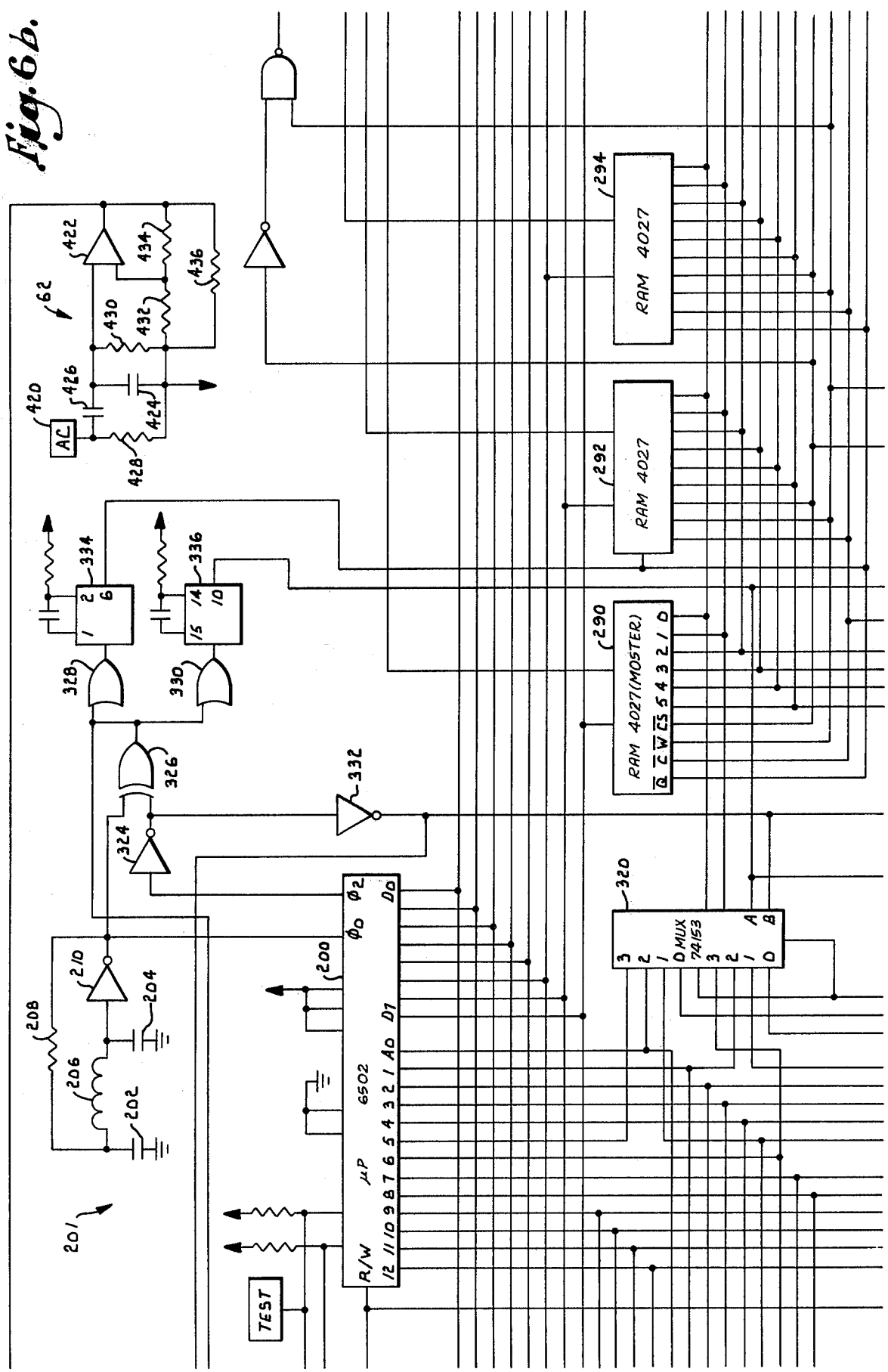
Figure 6D:
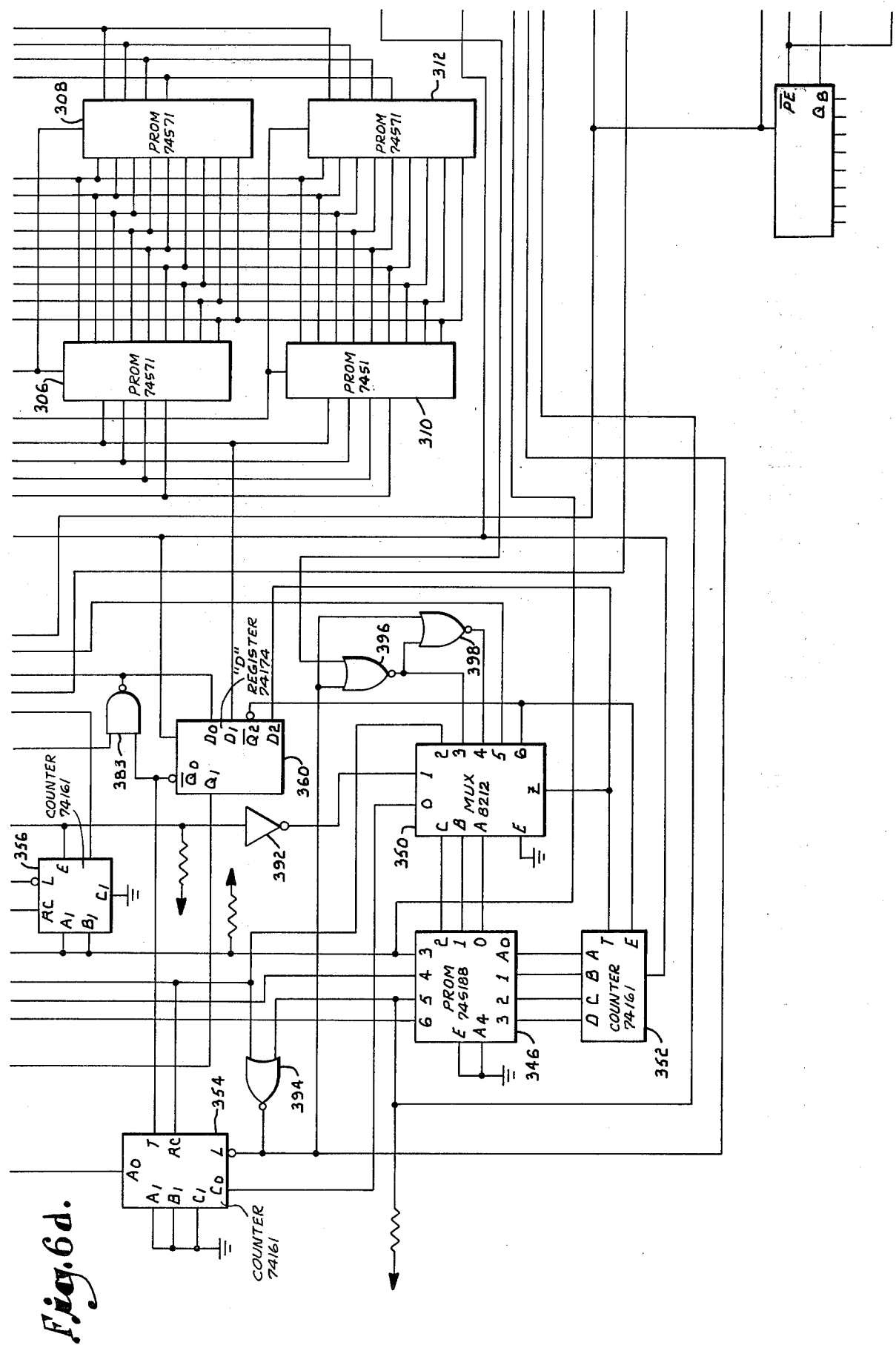
Figure 6E:
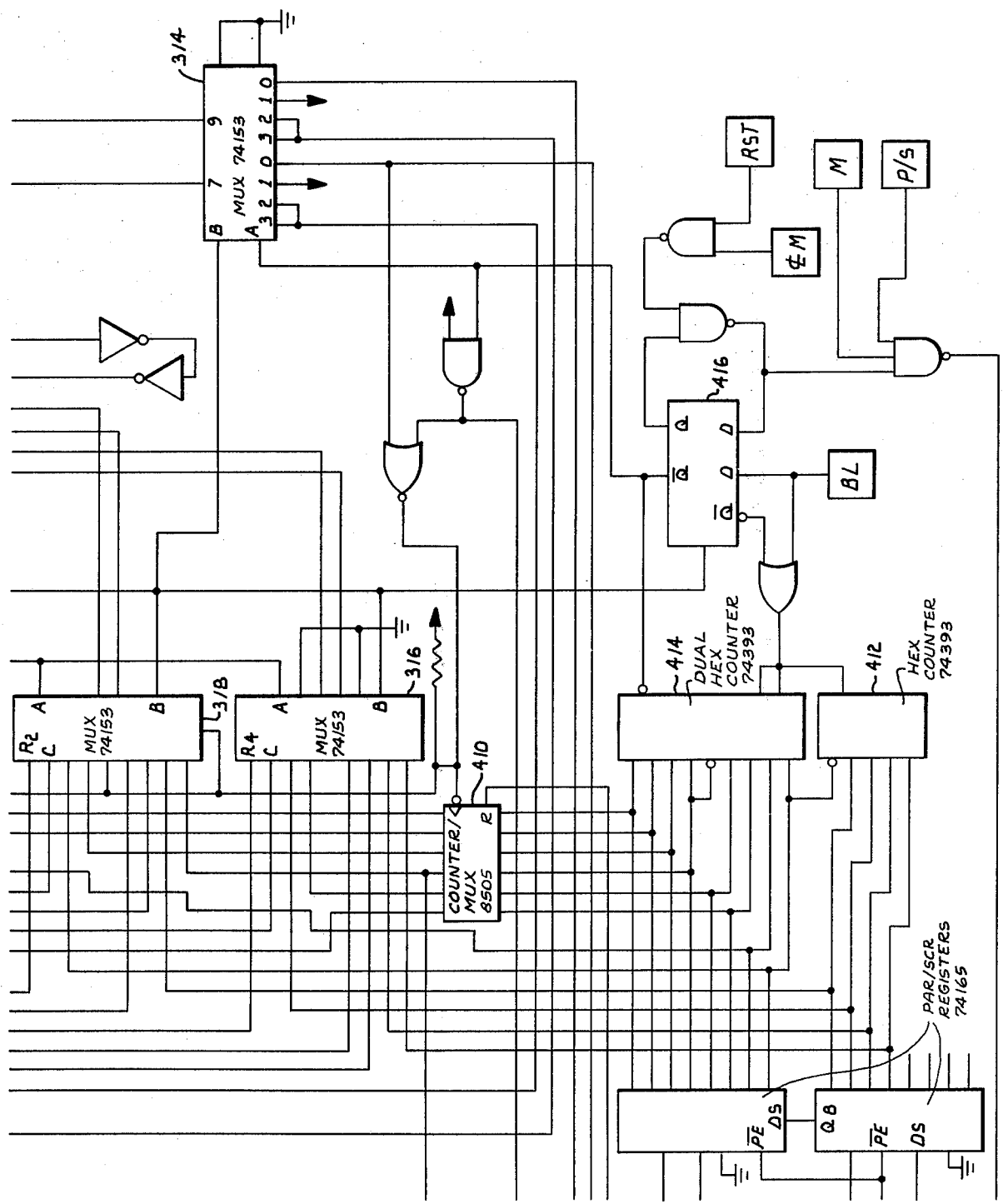
Figure 7A:
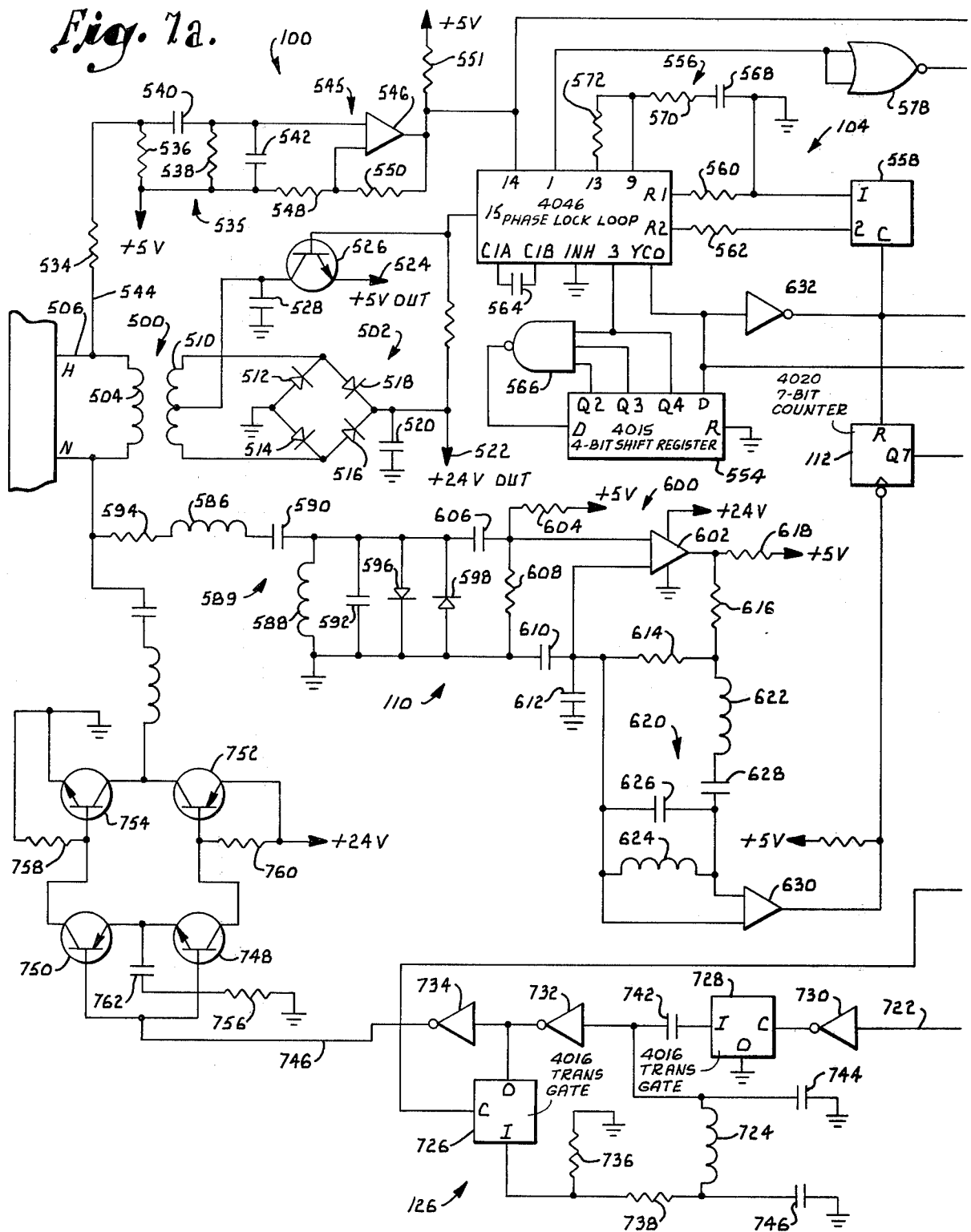
Figure 9:
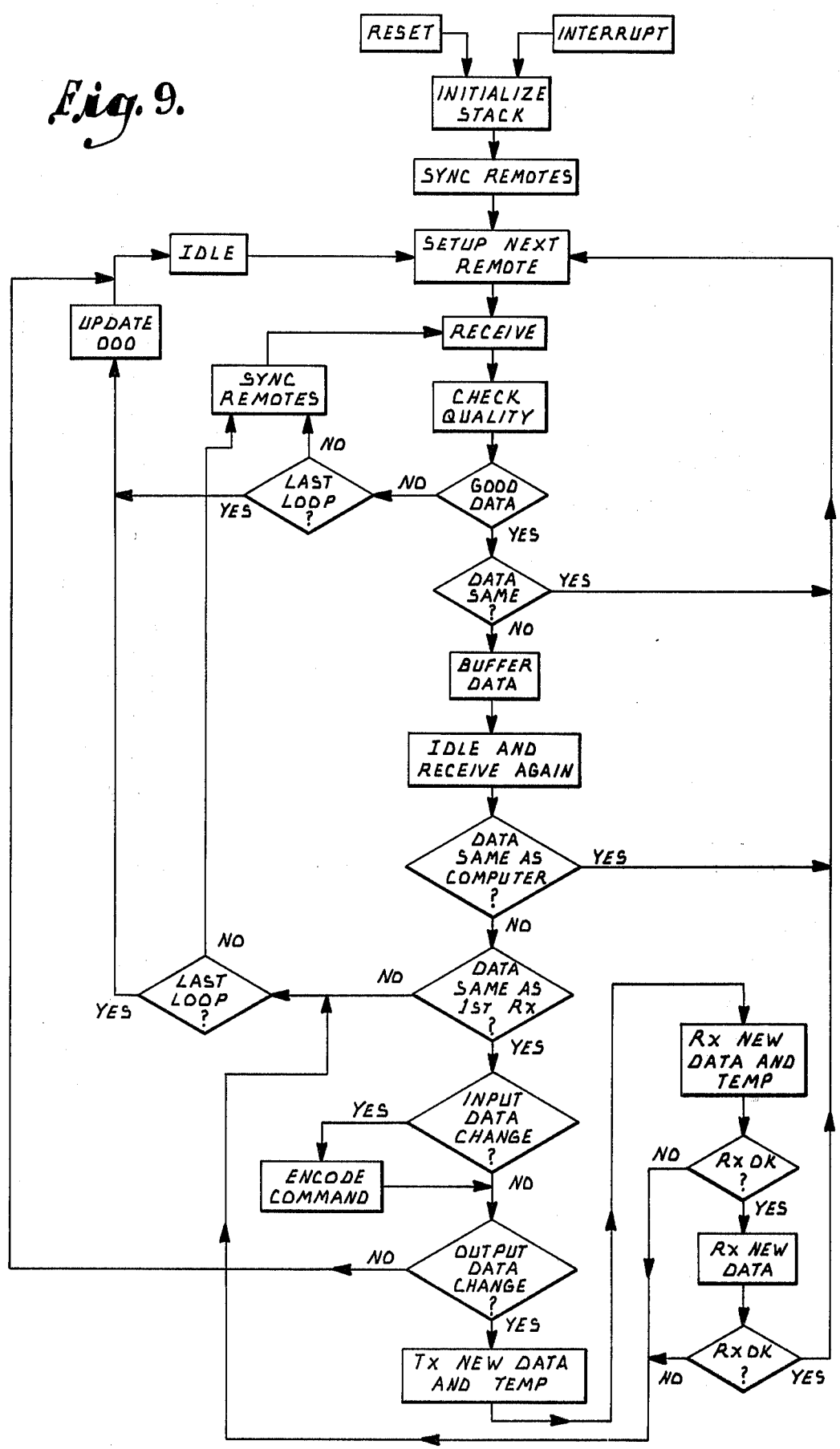

FIGS. 6a, b, c, d and e are to be arranged to provide a detailed schematic diagram of the transceiver unit of the AC power line communications system of the present invention;

FIGS. 7a and b are to be arranged to provide a detailed schematic diagram of the room control unit of the present invention;

FIG. 7c is a plot showing how FIGS. 7a and b are to be arranged for proper viewing;

FIG. 8 is a timing diagram showing the time relationship between the various operations performed by the central processing unit of the AC power line communications system of the present invention; and FIG. 9 is a flow chart of the polling routine executed by the central processing unit of the present invention.

Figure 1:
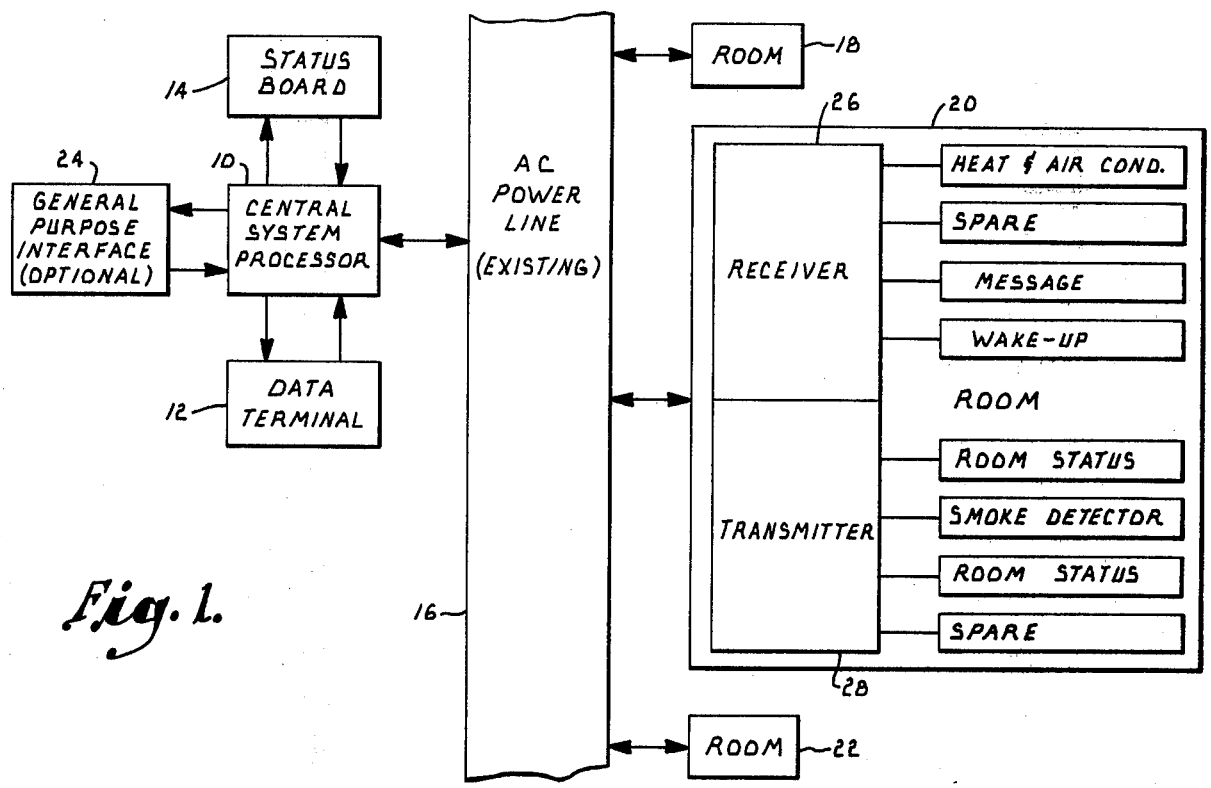
FIG. 1 is a block diagram of a room status indicating system incorporating the AC power line communications system of the present invention.

Referring now to the drawings, FIG. 1 shows an overall block diagram of a room status indicating system incorporating the AC power line communications system of the present invention. The heart of the room status indicating system is a central system processor 10. The central system processor is electrically coupled with a plurality of data terminals one of which is represented by the numeral 12 and a status display board 14. The control system processor includes the AC power line communications system of the present invention and, as a result, is capable of communicating with each room in the building or building complex which is equipped with a room control unit. Three such rooms are shown herein and are generally represented the numerals 18, 20 and 22. A general purpose interface 24 is provided to allow communication between the central system processor and a general purpose computer. This general purpose interface is arranged to perform all of the required data translations and the protocol needed to perform such communication.

The central system processor performs a number of different functions within the room status indicating system. In particular, this processor acts as a central data dispository which is capable of storing a room list and data pertaining to each room or designated area on the list. The central system processor is also responsible for processing all of the data which is received from the room control units and the peripheral data terminals. Additional functions performed by the central system processor include providing to a particular data terminal upon request data pertaining to a specified room and controlling the display of status information on the status display board to provide a central display of the status of each room.

The data terminals are arranged to input data to the system and to provide a convenient device for displaying upon request selected pieces of information concerning a particular room. These data terminals are of a conventional design which is well known to those skilled in the art and are of varying sophistication. The status display board, on the other hand, is comprised of a large display board having a list of all the rooms in the building or building complex and a light system for providing a visual display of the various status combinations of each room. The status display board is also of conventional design. A data terminal and status display board suitable for use with this invention are shown and described in U.S. Patent to Kabat et al., Ser. No. 3,810,096, which is incorporated by reference herein.

The central system processor periodically contacts each room control unit in the hotel, motel, or hospital complex over the electrical distribution network within the complex. The central system processor performs this polling function by first producing a digitally encoded interrogation signal containing an address portion representative of the room to be contacted and a data portion consisting of eight independent data messages. The encoded interrogation signal is then sent to every room control unit within the building or building complex over the electrical power distribution network of the building. Each of the room control units compare the address portion of the received interrogation signal with a unique address code which was previously programmed into the unit and responds to the reception of an interrogation signal containing its address code by transmitting an encoded return signal to the central system processor.

In the preferred embodiment of the invention, communication between the central system processor and the room control units is conducted over the neutral and ground lines of the power distribution network. It is desirable to use the neutral and ground lines because the introduction of loads to and the removal of loads from the power distribution network do not interfere with the transmission of data over these lines.

As represented by room 20, each room control unit includes a receiver (as represented by the numeral 26) for accepting interrogation and data signals from the central system processor and a transmitter (as represented by the numeral 28) for transmitting encoded return signals to the central system processor. Each room control unit is capable of monitoring various conditions within its associated room. Typically, the room control unit is arranged to monitor room status, the condition of a smoke detector device placed in the room and any other type of activity which is capable of being initiated upon the closure of a switch. Each room control unit is also capable of controlling various operating functions within each room and of performing a number of service function heretofore conducted by the hotel, motel, schools or hospital staff. In particular, the room control unit is arranged to remotely control the temperature within each room in the complex to provide a message waiting indication and to each room in the complex to automatically activate a wake-up signal in any room in the complex at a preselected time.

Figure 2:
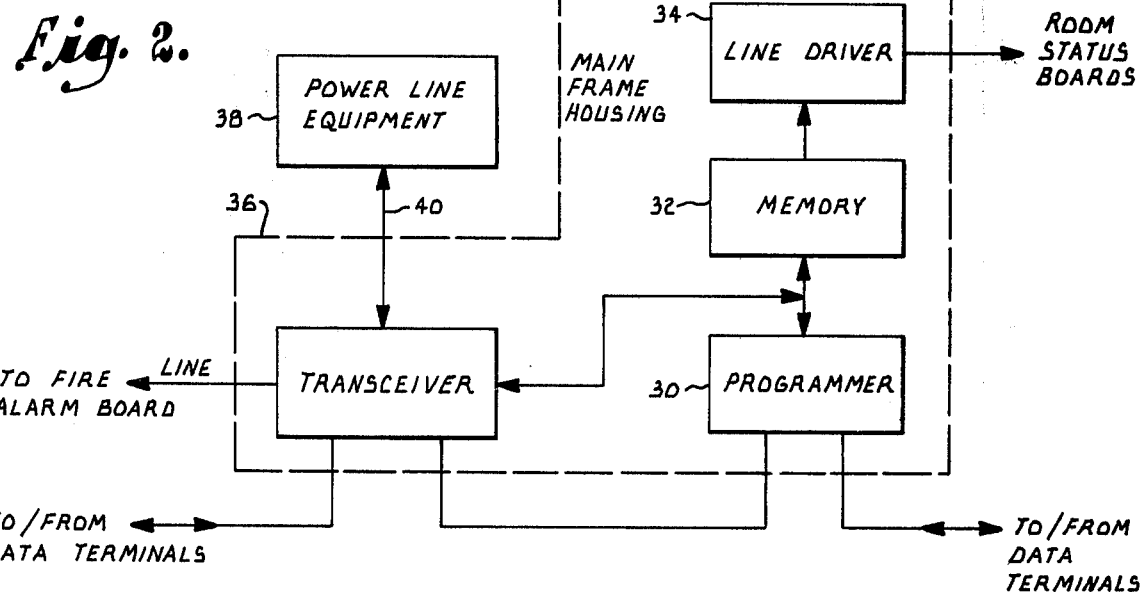
FIG. 2 is a block diagram of the central system processor shown in FIG. 1.

The central system processor is shown in greater detail in FIG. 2. As shown in this figure, this circuit is comprised of a programmer 30, a memory 32, a line driver circuit 34, and the central processing unit 36 of the power line communications system of the present invention. The central processing unit 36 is electrically coupled with the power line equipment 38 in the building or building complex as represented by conductor line 40. The various pieces of equipment which are represented by the power line equipment block 38 are shown and described in greater detail in the patent to Kabat et al., U.S. Pat. No. 3,810,096, which is incorporated by reference herein.

In its simplest form, programmer 30 is designed to control the sequence of events needed to process the received data. In particular, the programmer is capable of arranging and ordering the received data and cooperates with the memory unit 32 to store this data in the proper storage location within the memory unit. As a part of its processing function, the progrmmer sequentially contacts each of the input data terminals to extract newly inputted data from each of these terminals in a disciplined and orderly manner. Upon receipt of the data, the programmer causes the received data to be properly stored within the memory unit 32. The programmer is also responsible for retrieving stored data from the memory unit and for providing this data to the peripheral data terminals upon request. The programmer can, however, be designed to be a more sophisticated device which is capable of performing a number of additional functions. For example, the programmer can be made to correlate the stored data with status requests made by the hotel, motel or hospital staff at the peripheral data terminals to provide such things as a number corresponding to the number rooms which meet a requested status or to provide the number of a room which meets a requested status. A programmer suitable to perform all of these functions is shown and described in detail in the patent to Kabat et al, U.S. Pat.

No. 3,810,091 which is incorporated by reference herein.

The memory unit 32 stores a room list and data pertaining to each room or area on the list. While many different types of memory devices could be used in this system, the preferred embodiment is comprised of a recirculating shift register memory similar to the one shown and described in the patent to Kabat et al, U.S. Pat. No. 3,810,096 which is incorporated by reference herein.

The line driver circuit 34 uses data stored within the memory device 32 to continuously update the information displayed on the status boards associated with this system. A line driver circuit suitable for use in this system is shown and described in the patent to Kabat, U.S. Pat. No. 3,810,096, which is incorporated by reference herein.

It should be noted that the above described circuit blocks substantially comprise conventional circuitry which is commonly found in prior art room status indicating systems such as the one shown and described in the patent to Kabat et al, U.S. Pat. No. 3,810,096, which is incorporated by reference herein. The central processing unit 36, however, described a new add-on feature for room status indicating systems and operates in combination with the room control units which are placed in the rooms to be contacted to implement the two-way AC power line communications system of the present invention.

Central processing unit 36 is arranged to exercise control over the polling sequence performed by the AC power line communications system of the present invention. This circuit also digitally encodes the address and data words which form the interrogation signal and assembles these words into the interrogation signals which are transmitted to the room control units of the system over the power distribution network of a building or building complex. The central processing unit also decodes data received from the room control units and processes this data to update the stored data pertaining to the status of each of the rooms within the complex.

Reference is now made to FIG. 3 wherein the central processing unit is shown in greater detail. As shown in this figure, the central processing unit includes a microprocessor 42 which is interconnected with a memory array 44, a fire alarm encoder circuit 46, party-line interface circuit 48 and an interface unit 50 by means of a data bus 52. The central processing unit also communicates with a direct memory access address control circuit 54 over a data bus 56.

The memory array 44 is arranged to retain a room list, data pertaining to each room or designated area on the list and the programs used to run the microprocessor 42. The party line interface circuitry 48 operates in combination with the direct memory access address control circuitry 54 to introduce directly to the memory array data which is inputted to the room status indicating system from the peripheral data terminals. This circuitry is also responsible for correlating the data stored within the memory array with the data stored within memory 32 (FIG. 2) of the room status indicating system to ensure that the data stored within each of these memory units coincides.

Interface unit 50, is responsible for running the AC transmitter 58 and the AC receiver 60 in response to control signals from the microprocessor. The AC transmitter 58 is a constant amplitude, frequency shift keying device which is capable of introducing the neutral line of the power distribution network a signal having a frequency equal either to one of the preselected two transmission frequencies. The AC receiver 60, on the other hand, is a wide open FM receiver designed to provide sufficient sensitivity to detect the incoming data by searching above the normal noise level found on the AC power lines to detect the incoming data.

A 60 Hz sync circuit 62 is provided to derive an accurate timing signal from the 60 Hz AC current signal present in the power distribution network. Deriving the timing signal in this manner ensures proper synchronization between the transmitted data and the 60 Hz AC current. The 60 Hz AC current signal provides a universal time base which is useful to maintain synchronization between the central processing unit and all of the room control units.

The fire alarm encoder 46 is responsive to data from the central processing unit and to data stored within memory unit 32 to produce a serial string of on and off signals which are used to control a fire alarm status display board. The fire alarm status display board includes a list of all of the rooms in the complex and an associated light display which is operable to provide a visual signal if the smoke detector in any of the rooms is activated. This status display board is similar to status display board 14 which is described above.

The microprocessor 42 is programmed to exercise control over the polling operation performed by this system. In particular, this device is programmed to interrogate each room control unit in a set sequence and to process the data received from the room control units to ensure that the data stored within memory array 44 accurately reflects the condition of the room control unit. In order to meet this operating requirement, the polling routine incorporates a sophisticated error-type checking feature.

The polling function performed by the microprocessor is graphically illustrated by FIG. 8. Line A of FIG. 8 shows the operation of the microprocessor when received and stored data conicides. Like B of this figure, on the other hand, illustrates the sequence of events performed by the microprocessor in updating data stored in its associated memory array in response to a change in the data accumulated by the room control units. The last figure, which is designated line C shows the operating sequence employed by the microprocessor to change the data stored within the room control unit in response to new data introduced to the system from a peripheral data terminal.

The microprocessor initiates the polling sequence by transmitting a synchronization signal. The synchronization signal is comprised of a long series of data "ones" followed by a single data "zero". Following transmission of the synchronization signal, the microprocessor transmits an interrogation signal comprising twenty-four bits of information. The first sixteen bits of this signal represent the address of a particular room control unit. As shown in line A of FIG. 8, sixteen bits of the interrogation signal define an address code representative of the room control unit associated with room 1101. The next eight bits of the transmitted signal consist of eight independent data messages which are utilized by the room control unit to perform various functions. In the preferred embodiment of the invention, the first four bits of the transmitted data code are utilized by the room control unit to control the temperature setting of the thermostat within the room. The next two bits of the data code are used to perform an energy conservation function. In particular, these two bits are used by the room control unit to control the operation of the heating and air conditioning system within the room. While the final two bits can be used to control any of a number of different functions, it is contemplated that one of these two bits will be used to activate a message-waiting indicator within the room while the other bit will be used to automatically activate a wake-up device within the room.

Upon receiving the transmitted signal, the room control unit designated by the address code responds to this signal by transmitting a return signal containing eight independent data messages back to the central processing unit. Four bits of this data code pertain to data previously provided to the room control unit from the central processing unit. The final four bits of the return code, however, represent data accumulated by the room control unit from external sources.

Upon receiving the return signal, the central processing unit compares the data contained in this signal stored within its attendant memory array 44. If the received data code coincides with the stored data, the microprocessor continues on with the polling sequence by contacting the next room which in this case is room 1102.

The data received from the room control unit is stored in the central processing unit until it is subsequently updated. The operating sequence employed to update the data stored in this the central processing unit is shown in line B of FIG. 8. As shown by this line, the microprocessor initiates the polling operation by transmitting a synchronization signal. During the first time frame following transmission of the synchronized signal, the microprocessor causes the first room control unit to be interrogated. In this example, the first room to be interrogated is designated by the number 1101. For the purpose of illustration, it is assumed that all of the data contained within the return signal from this unit coincides with the data stored within the memory array associated with microprocessor. As a result, the microprocessor. As a result, the microprocessor continues the polling sequence by causing the next room to be contacted. In this example, the next room to be contacted is designated by the number 1102. For the purpose of illustration, it is assumed that the room control unit has accumulated new data since it was last interrogated. Accordingly, the data transmitted by the return signal from this room control signal no longer corresponds to the data stored within the central processing unit. The microprocessor, however, does not know if the data change has been caused by new data or by noise on the communications line.

Upon detecting a difference in the data of the first return signal and the stored data, the microprocessor enters an idle condition wherein a dummy code is transmitted. The dummy code does not correspond to any one of the room control units and the microprocessor does not search for a return signal following the transmission of this signal.

Following transmission of the dummy code, the microprocessor causes the room control unit in room 1102 to be interrogated for a second time. This activity is represented by fourth time frame upon receiving a second return signal from this room control unit, the microprocessor compares this signal with the data stored within its associated memory array. If the data contained in the second return signal coincides with the stored data, the microprocessor assumes that the discrepancy in the first return signal was caused by noise on the communications line. Upon making this determination, the microprocessor continues on with the polling operation by interrogating the next room control unit which in this case is designated 1103.

A discrepancy, however, between the data contained in the second return signal and the stored data causes the microprocessor to compare the data of the first return signal with the data of the second return signal. If the data contained in each of these two return signals coincides, the microprocessor assumes that the difference in this data and the data stored in its associated memory array is the result of new data rather than noise on the communications line. Upon making this determination the microprocessor initiates the updating routine.

In the updating routine, the microprocessor makes a rigid comparison of the data received in the first and second return signal and the data stored within its associated memory array to determine exactly where the difference lies. In this example, it is assumed that the difference resides in the data portion of the return signal which pertains to the data accumulated by the room control units. Upon making such a determination, the microprocessor as shown in frame five enters another idle condition wherein the microprocessor causes another dummy code to be transmitted and the data stored within its memory array to be updated. The updated data is returned in the memory array until this data is updated during a subsequent interrogation cycle. Following this idle condition the microprocessor continues on with the polling sequence as shown in time frame six.

The operating sequence employed by the microprocessor to provide updated data to the room control unit is illustrated line C of FIG. 8. As shown therein, the central processing unit initiates the polling sequence by transmitting a synchronization signal. The first time A frame in this line represents the interrogation of room number 1101. For the purpose of illustration it is assumed that the data stored within this room control unit coincides with the data stored within the central system processor. As a result, the central system processor continues the polling sequence by contacting, as represented by the second time frame, the room control unit within room 1102. Upon interrogation of room 1102, the room control unit associated with this room responds by transmitting a return signal to the central processing unit. A comparison of this the return data with the data stored within the central system processor shows that there is a difference in this data. Since, the microprocessor does not know if this difference is the result of a change in the stored data or is caused by noise on the communications line, the microprocessor interrogates this room control unit a second time following the occurrence of an idle condition wherein a dummy code was transmitted. The microprocessor then compares the data contained in the second return signal with the data stored in its associated memory array. In this example the data stored in the memory array has been changed since the last interrogation by the introduction of new data into the system by means of a peripheral data terminal. As a result, the data transmitted by the second return signal does not coincide with the data stored in the central processing unit. The microprocessor then compares the data of the first return signal with the data of the second return signal to determine if they coincide. Coincidence between the data of the first and second return signals indicates to the microprocessor that the discrepancy in the stored and received data is caused by data change rather than by noise on the communications line.

Upon making this determination, the microprocessor rigidly compares the received data with the stored data to determine where the discrepancy lies. In this example, the difference resides in the data portion of the return signal which corresponds to the data previously provided to the room control unit from the central processing unit. Accordingly, the microprocessor causes the room control unit to be interrogated for a third time as represented by the fifth time frame. Reception of this third interrogation signal causes the room control unit to temporarily store the new data which accompanies the address code and to transmit to the microprocessor a return signal containing the newly received data and the data accumulated by the room control unit. The microprocessor thus reviews this return signal to determine if the data returned by the room control unit coincides with the data transmitted by the microprocessor. If this data coincides, the microprocessor interrogates the room control unit for a fourth time causing the new data to be permanently stored within the room control unit. As represented by the seventh time frame, the microprocessor then interrogates the room control unit for a fifth time. The room control unit responds to this fifth interrogation by sending a return signal comprising the newly stored data and the data accumulated by the room control unit from external sources. The microprocessor reviews this return signal to determine if the new data is properly stored within the room control unit. Once the microprocessor is satisfied that this new data is properly stored within the room control unit, it continues the polling sequence by contacting the next room as represented in the eighth time frame.

Figure 4:
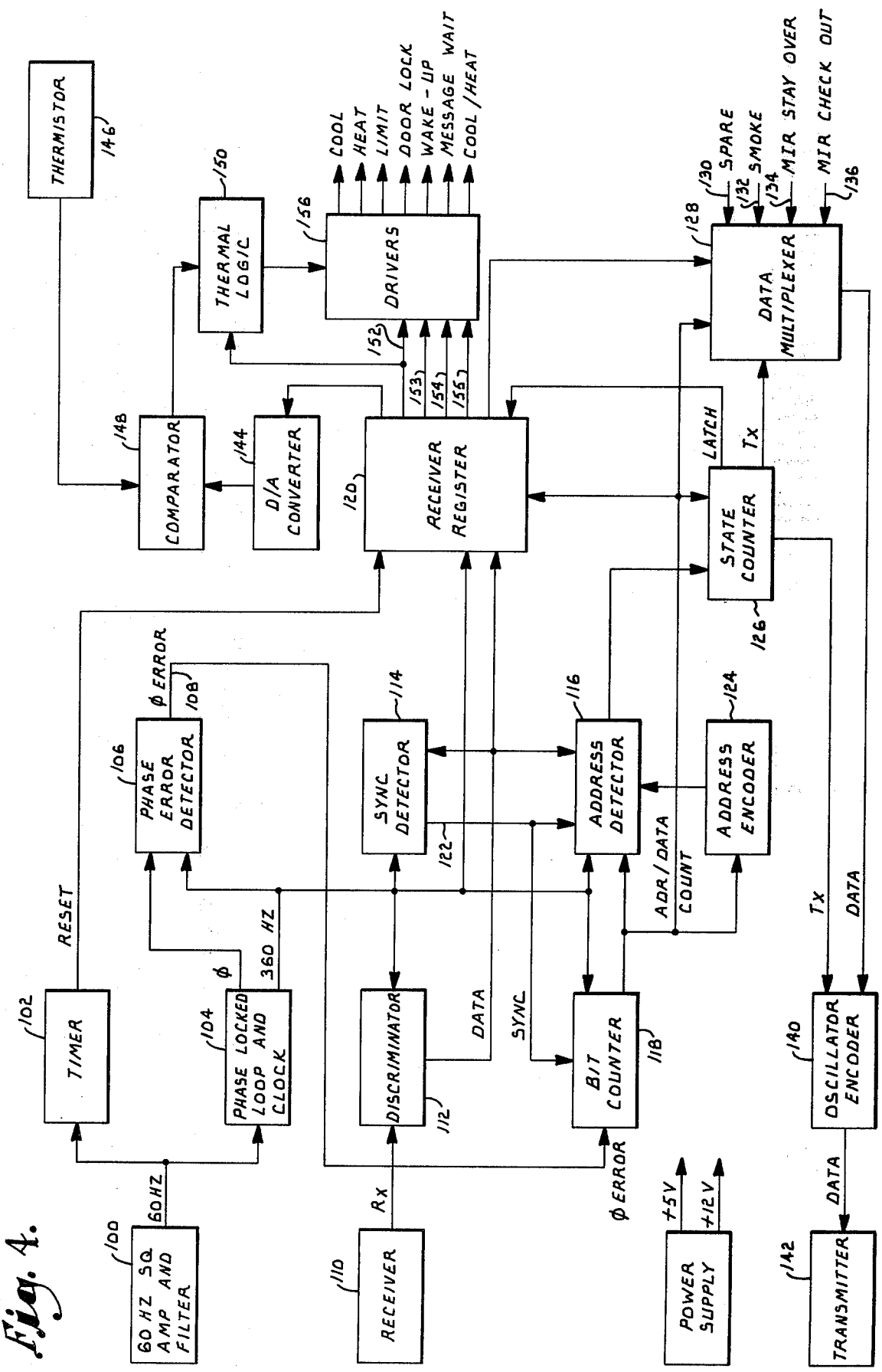
FIG. 4 is a block diagram of the room control unit of the AC power line communications system of the present invention.

A block diagram of the room control unit is set forth in FIG. 4. The timing signal needed to control and operate the functional elements of the room control unit are derived from the AC power signals present in the power distribution network by means of a 60 Hz squaring amplifier and filter circuit 100, a timer circuit 102, a phase-locked loop and clock circuit 104 and a phase error detector 106.

The 60 Hz squaring amplifier and filter circuit converts the 60 Hz AC power signals present on the power distribution line into a square wave suitable for use as a clock signal. This clock signal is simultaneously provided to the timer circuit 102 and to the phase-locked loop and clock circuit 104. The timer circuit 102 is comprised of a counting circuit which is capable of counting a preselected number of clock signals to establish a predetermined time period. If an interrogation signal is not received from the central processing unit within the time period established by the timer circuit, this circuit causes the room control unit to be reset and returns all of the outputs associated with this unit to their normal state.

The phase-locked loop and clock circuit 104, on the other hand, utilizes the 60 Hz square wave produced by the 60 Hz squaring amplifier and filter circuit 100 to generate a 360 Hz square wave which serves as the basic timing signal for the room control unit. The phase-locked loop and clock circuit 104 is effective to synchronize this timing signal with the AC power signal in the power distribution network. The phase error detector circuit cooperates with the phase-locked loop and clock circuit to monitor the phase relationship between the 360 Hz square wave generated by the phase-locked loop and clock circuit and the 60 Hz AC power signal preset on the power distribution network. The phase error detector is operable to produce a phase error signal as represented by output 108 whenever the two signals become out of phase.

Reception and decoding of the transmitted interrogation signals is performed within the room control unit by the receiver circuit 110, the discriminator circuit 112, the sync detector circuit 114, the address detector circuit 116 and the bit counter 118. Receiver 110 is electrically coupled with the neutral line of the power distribution network through a high impedance network. This circuit receives the transmitted data and serves to amplify and filter this data before providing it to the discriminator circuit 112.

The discriminator circuit uses the 360 Hz timing signal produced by the phase-locked loop and clock circuit 104 to decode the received interrogation signals. The decoded data obtained from the received interrogation signal is then sent to the sync detector circuit 114, the address detector circuit 116, and to the receiver register 120.

The sync detector circuit 114 is arranged to recognize the reception of a synchronization signal from the central processing unit and to respond to such a signal by generating a sync signal as represented by output 122. The sync signal produced by the sync detector circuit 114 in response to a synchronization signal from the central system processor is simulataneously sent to the bit counter 118 and to the address detector circuit 116.

The bit counter is a counting circuit which is used to delineate the address and bit portions of the interrogation signal. In particular, this circuit is a counting circuit which is capable of counting a preselected number of counts corresponding to the address portion of the interrogation signal and a preselected number of counts corresponding to the data portion of the interrogation signal. Reception of a sync signal by the bit counter causes this circuit to be reset to a count state of zero. Thereafter, the 360 Hz timing signal produced by the phase-locked loop and clock circuit is used to clock the bit counter circuit. In response to this clock signal, the bit counter begins its address counting sequence which comprises counting sixteen clock pulses. Upon counting sixteen clock pulses, the bit counter initiates a bit counting sequence which comprises the operation of counting eight clock pulses. Upon completion of the bit counting sequence, the bit counter immediately initiates its address counting sequence once again. As a result the bit counter circuit continuously performs these two counting operations in a sequential manner unit this circuit is reset by the reception of a sync signal from the sync detector circuit or by the presence of a phase error signal from the phase error detector.

The address detector circuit 116 is operable to continuously search the received interrogation signals for a particular address code. In particular, the address detector circuit compares the address portion of the interrogation signal with an address previously programmed into the address encoder 124 to determine if these codes coincide. Coincidence between these two codes causes the room control unit to be placed in condition to receive the data which accompanies the received address code. The address programmed into the address detector 124 is unique for each room control unit. In this way, each room control unit is capable of being selectively contacted by transmitting the address code corresponding to that unit.

Storage of the received data within the receiver register 120 is regulated by the state counter 126. In particular, the count state of this circuit controls the application of data to the receiver register. If the received address code coincides with the programmed address code, the state counter is incremented one count state signifying that this room control unit has been contacted by the central processing unit. Thereafter, the data received during the next eight counts of the bit counter are clocked into the receiver register for temporary storage. The data permanently stored within the receiver register is also fed out of this register and is provided to the data multiplexer 128 along with the data accumulated by the room control unit at inputs 130, 132, 134, 136 and 138. The data multiplexer assembles this data into a return signal suitable for transmission to the central processing unit. Once the return signal is properly assembled, this signal is provided to the oscillator encoder circuit 140 which uses a frequency shift keying technique to encode this digital data into a frequency signal for transmission to the central processing unit by the transmitter 142. The transmitter is electrically coupled with the neutral line of the power distribution network through a low impedance coupling network.

The central processing unit compares the data contained in the return signal with the data stored in its associated memory array (see FIG. 8). If the received data does not coincide with the stored data, the central processing unit transmits a dummy signal followed by a second interrogation signal to the room control unit. The dummy signal resets the state counter. Upon receipt of this second interrogation signal, the state counter 126 is incremented to state one again and a second return signal is sent to the central processing unit. If a comparison of this second return signal indicates that the data stored within the room control unit needs to be updated, the central processing unit transmits a third interrogation signal to this room control unit. Receipt of this third interrogation signal causes the state counter to obtain a count state of two. Acquisition of a count state of two causes the data received during the next eight bits of the bit counter to be clocked into the receiver register for temporary storage and for this data to be provided to the data multiplexer for assembly with the data accumulated by the room control unit. The assembled return signal is then provided to the oscillator and encoder for transmission to the central processing unit after the next interrogation. If the return signal coincides with the stored data, the central processing unit interrogates the room control unit for a fifth time. Upon receiving this fifth interrogation signal, the count state of the state counter is once again incremented. The state counter responds to a count state of four by causing the data received during the third interrogation to be permanently stored in the receiver register. The room control unit also transmits a return signal comprising the newly stored data and the data accumulated by the room control unit. This fourth return signal is once again reviewed by the central processing unit to determine if it coincides with the stored data. If this return signal is satisfactory, the central processing unit causes the fourth return signal to serve as a final confirmation that the new data has been properly stored within the room control unit.

| Cycle | | State | Computer Return | Computer Interrogation |
|---|---|---|---|---|
| 1 | Tx-Mon | 1 | 1 | 1 |
| 2 | Idle | 0 | | |
| 3 | Tx-Mon | 1 | 2 | 2 |
| 4 | Rx-Data | 2 | | 3 |
| 5 | Tx-Echo | 3 | 3 | 4 |
| 6 | Tx-Mon & Latch | 4 | 4 | 5 |

Timer circuit 102 is reset in response to a state counter count state of one. When this timer completes its timing sequence a reset signal is provided of the receiver register. This reset signal causes the receiver register to output at terminals 152, 153, 154, and 155 four bits of the data permanently stored within this register. This data is provided to a driver circuit 156 which amplifies these data signals before using them to control various outputs.

In the preferred embodiment of the invention, four of the eight data bits of the received data (State 2) are used to remotely control the temperature of the room in which the room control unit is placed. In particular, these four bits of information represent sixteen different temperature settings which range in value from 60° F. to 90° F. inclusive. These four bits of information are initially sent from the receiver register 120 to a digital-to-analog converter 144 which converts this digital information into an analog signal representative of the selected temperature. A thermistor 146 is located in the room to produce an electrical signal having a voltage indicative of the temperature within the room. These two temperature signals are then compared in a comparator circuit 148. This circuit produces a difference signal having a voltage related to the difference between these two signals. The difference signal is then provided to the thermal logic circuitry 150 along with a heating/cooling signal from the receiver register as represented by conductor line 151. The heating/cooling signal comprises another of the message bits transmitted by the interrogation signal. This data bit is indicative of the operating condition of the building's heating and/or cooling system. The thermal logic circuitry monitors the difference signal from the comparator circuit and the heating/cooling signal from the receiver register to control the operating condition of the equipment used to deliver heated or cooled air to the room. The thermal logic circuitry is arranged to activate the air delivery equipment if the heating/cooling signal is representative of the cooling mode of operation and the difference signal is indicative of a temperature above the transmitted temperature or if the heating/cooling signal is representative of the heating mode of operation and the difference signal is indicative of a measured temperature below the transmitted temperature.

In a building or building complex wherein each room is equipped with its own heating and/or cooling unit, a single limit signal is transmitted to the room control unit, a single limit signal is transmitted to the room control unit to override the normal temperature control of this equipment. In particular, the room control unit responds to this limit signal by either shutting off the heating and/or cooling equipment or transferring the thermostat within the room to a preselected temperature setting. The limit signal may also be used in combination with the temperature setting circuitry described above to remotely control the temperature within each room of the building or building complex.

In order to reduce the impact of the line loading problem associated with the placement of a plurality of room control units on a single communications line, it is necessary to have each of these room control units present a high input impedance to the transmitted signal. It is also desirable, however, to couple the transmitter in each room control unit to the neutral line of the power distribution network through a low impedance coupling network. To meet these two operating criteria, the room control units are equipped with a unique transmitter which is coupled with the neutral line of the power distribution network through one branch of a three branch coupling network. This transmitter and the three branch coupling network used to connect the transmitter and receiver of the room control unit to the neutral line of the power distribution network is shown in greater detail in FIG. 5. As shown in this figure, the three branch coupling network 170 includes three distinct branches 172, 174 and 176 which are electrically coupled to each other at a common mode 178. Branch 172 is coupled directly with the neutral line of the power distribution network. Branch 174, on the other hand, is connected to the receiver within the room control unit by means of a high impedance resistor 180 and a filter and amplifier circuit 182. The third branch 176 of this coupling network is arranged to couple the unit's transmitter to the neutral line of the power distribution network through an LC filter 184 which is comprised of an inductor 186 and a capacitor 188. The transmitter, which is shown in this figure, is formed in a tri-state switching device comprised of a pair of switching transistors 190 and 192 and associated logic circuitry 194. Switching transistor 190 is a PNP type transistor which has its base terminal connected with the transistor logic circuitry, its collector terminal connected to branch 176 and its emitter terminal connected to an external voltage source at 196. Switching transistor 192, on the other hand, is a NPN type transistor which has its base terminal electrically coupled with the transistor logic circuitry, its collector terminal connected with branch 176 and its emitter terminal connected to ground at 198. During transmission of the return signal, these transistors alternately switch from a saturated state to a cut-off state in response to an oscillating voltage signal simultaneously provided to the base of each of these transistors. In this way, these switching transistors alternately switch between the external voltage source and system ground to introduce a large level signal into the neutral line of the power distribution network with the frequencies of this signal being controlled by the frequency of the alternating signal provided to the base terminals of the switching transistors from the transistor logic.

The transmitter described herein is called a tri-state device because it is arranged to assume one of three different operating states. The first operating state is present when the transmitter is not transmitting. If the transmitter is not transmitting, there is no voltage signal being provided to the base terminal of either switching transistor. In this case, both of the switching transistors are cut-off thereby providing an open circuit between the transmitter and the neutral line. The second operating state is obtained whenever a negative voltage is provided to the base terminals of these switching transistors. In this operating state, switching transistor 190 is saturated thereby providing a closed circuit between the external voltage source at 196 and the branch line 176. The third operating state is obtained whenever a positive voltage is provided to the base terminals of these switching transistors. In this operating state, switching transistor 192 is in a saturated state thereby coupling branch line 176 with the system ground 198. In the preferred embodiment shown herein, the tri-state switching device is arranged to switch between a positive reference voltage and system ground. It should be note, however, that it is only necessary to have this device switch between a voltage differential.

Referring now to FIGS. 6a, b, c, d and e, a detailed schematic diagram of the transceiver is shown in these figures. A microprocessor unit, which is generally designated by the numeral 200 forms the heart of the power line interface unit. The unit is is comprised of an MCS 6502 microprocessor which is manufactured by Mos Technology, Inc. This microprocessor includes an arithmetic and logic unit, and instruction register, a control unit, bus interface logic, clock logic circuitry and a number of programmable registers including an accumulator, a pair of index registers, a program counter, a stack pointer and a status register. A more detailed description of this circuit and its operation is given in the *Synertex Mos Data* catalog, which was published in January of 1978 and is incorporated by reference herein.

The central processing unit is driven by an LC clock 201 which is comprised of inductor 206, resistor 208, inverter 210 and capacitors 202 and 204.

The transmission of data to and the reception of data from the room control unit is controlled by the interface unit 12 which is comprised of an MCS 6522 peripheral interface adaptor manufactured by Mos Technology, Inc. For a more detailed description of this circuit element, reference is made to the *Synertext Mos Data* catalog published January, 1978. The MCS 6522 is a general purpose input/output device having 16 I/O pins configured to provide two eight bit I/O parts.

The transmission of interrogation signals is performed within the central processing unit by the AC transmitter 58. The AC transmitter is comprised of an FM transmitter comprised of a four bit binary counter 214, a HEX D flipflop 215, an Exclusive OR gate 225 and a quad D-flipflop 216 which cooperate to derive the transmission frequencies in the range of 50 to 120 KHZ from a 2 MHz signal which is provided to flipflop 216 from the interface unit 212 by means of conductor lines 218 and 220. The pp terminal transmission frequency can vary depending on the actual building and/or environment. These frequency signals are provided to a push/pull output transmitter 222 by means of logic gates 224, 226, 228, 230 and 231. This push/pull output transmitter is comprised of a pair of switching transistors 232 and 234, a coupling transformer 236 and a fuse element 238 which couples a power source to the center tap of transformer coil 236. Primary coupling transformer 236 is comprised of a transformer coil 237 which interacts with secondary coil 240. The secondary coil is electrically coupled with the neutral line of the distribution network at 242 through an LC filter network 241 comprised of conductor 244 and capacitor 246.

The AC receiver used in the central processing unit is equipped with an input filter 243 which is arranged to define the acceptable frequencies of entry. This input filter is comprised of a pair of inductors 248 and 250 and a pair of capacitors 252 and 254. These reactive components are interconnected to form a band pass filter having a 3 DB chebsheve response with peaks at the transmission frequencies. An input dampening resistor 256 and a pair of diodes 258 and 260 are provided to protect the receiver from large transmission signals present on the power distribution network. Amplification of the filtered signals is performed by a comparator comprised of D. C. amplifier 262 and associated circuit elements 264, 266, 268 and 270. Resistors 272 and 274 are interconnected across the input and output terminals of this amplifier to provide a form of feedback which is designed to bias the comparator close to the AC average point. Under normal operating conditions, the AC average point is close to zero volts. The output of this comparator circuit is electrically coupled with a second filter network 273. This second filter network is comprised of another LC filter which is made up of a pair of inductors 276 and 278 and a pair of capacitors 280 and 282. Another operational amplifier 284 is provided to further amplify and limit the received signal. The output of this operational amplifier 284 is electrically coupled with input pin 66 of the interface unit by means of an electrical conductor line 288.

The memory array which is used herein includes a plurality of dynamic ram elements 290, 292, 294, 296, 298, 300, 302, and 304 and a plurality of programmable read only memories 306, 308, 310 and 312. A more detailed description of dynamic ram elements is given in the 1977 Mostek Memory Products catalog. The programmable read only memories, on the other hand, are described in greater detail in 1977 National Semiconductor Memory Data Book. The memory array also includes a plurality of dual 4 input multiplexer circuits 314, 316, 318 and 320 and a octal tri-state buffer 322 for correlating the address of the data stored within this memory array with the sequential location of the data stored within the memory of room status indicating system. The memory array is also provided with a plurality of logic gates 324, 326, 328, 330 and 332 which operate in conjunction with a pair or retriggerable, resettable monostable multivibrators 334 and 336 to control the strobing of data into the memory elements of the memory array.

The AC power line communication system of the present invention includes a party-line interface circuit which is generally designated by the numeral 48 and a direct memory access address control circuit which is generally designated by the numeral 54. These circuits cooperate to make this system capability for use with a conventional room status indicating system such as the one shown and described in the patent to Kabat etal, U.S. Pat. No. 3,810,096 which is incorporated by reference herein. The party-line interface cooperates with the direct memory access address control to correlate the data stored within the memory array of the central processing unit with the data stored within the memory 32 (FIG. 2) of the room status indicating system. In particular, these circuit blocks cooperate to perform two principle functions. First, they cooperate to output data stored within the memory array associated with the central processing unit in sync with data from the memory 32 (FIG. 2) of the room status indicating system. This simultaneous read-out of data from the central processing unit and the room status indicating system allows for the use of the same encoding format for all of the data to be displayed. These two circuit blocks also cooperate to accept new data from the peripheral data terminals simultaneously with the transmission of this data to the memory 32 (FIG. 2) of the room status indicating system and to provide updated data received from the room control unit to the memory 32 (FIG. 1) of the room status indicating system.

The party-line interface circuit 48 is arranged to convert a long string of manchester encoded data into a format suitable for introduction to a microprocessor data bus. In order to perform this function, the party-line interface includes a tri-state eight bit universal I O shift register which is designated by the numeral 342. This circuit element is a conventional input/output device and is manufactured by National Semi-Conductor Corporation and is designated by the manufacturer's number 8546. A more detailed description of this circuit element is given in the 1976 National Semi-Conductor TTL data book. Briefly, this circuit element is comprised of an eight bit shift register which is capable of accepting data in a bit stream and of outputting this data in a parallel form. Conversely, this circuit is also capable of receiving data in parallel form from a microprocessor data bus and of shifting the data out in the form of a serial bit stream. The transfer of data to and from the power line interface unit through this input-/output device is controlled by a number of circuit elements including a pair of 256 bit open collector programmable read only memories (Proms) 344 and 346, a pair of data selector/multiplexers 348 and 350, a plurality of 4 bit binary counters with synchronous resets 352, 354 and 356, a hex D-flipflop with clear 215 and a quad D-flipflop with clear 360. The 256 bit open collector programmable read only memories are manufactured by the National Semi-Conductor Corporation and are identified by the manufacturer's number 74LS 188. A more detailed description of these circuit elements is given in the 1977 National Semi-Conductor Memory Data Book. The data selector/multi-plexers are also manufactured by the National Semi-Conductor Corporation and are identified by the manufacturer's part number 8312. Reference is made to the 1976 National Semi-Conductor TTL Data Book for a more detailed description of these circuit elements.

The data present on the party-line is received by the party-line interface circuit at the DMC connector 362. The incoming data is then filtered to remove high and low frequency noise by means of a comparator 363 which is comprised of a DC amplifier 364 and associated circuit elements including resistors 366, 368, 370, 372, 374, 376 and 378 and capacitors 380 and 382. The party-line interface circuit also includes several logic gates which are used in interconnection of the various circuit elements of the party-line interface. These logic gates include inverter 342, Nand gates 384, 386, 388 and 390, and Nor gates 394, 396, and 398.

The party-line interface is also equipped with a 6 bit unified bus comparator 400. This circuit element is manufactured by the National Semi-Conductor Corporation and is identified by the manufacturer's number 8131. A more detailed description of this circuit element is given in the 1976 National Semi-Conductor TTL Data Book.

Data stored within the total line interface unit is provided to the interface line by means of a transmitter located within the party-line interface. This transmitter is comprised of a switching transistor 402 which is biased by a pair of resistors 404 and 406. The collector terminal of this transistor is electrically coupled with the DMC connector input 362 by means of diode 408.

The direct memory access address control directs the data received by the power line interface to the appropriate memory locations. This control block is equipped with a MOS dynamic memory refresh logic circuit 410 which is manufactured by Motorola, Inc. and is identified by manufacturer's part number 8505. Reference is made to the Motorola Data Library Volume VII, Series 8, 1975 for a more detailed description of this circuit element. The MOS dynamic memory refresh logic circuit acts an address counter and multiplexer which provides direct access to all of the data stored within the memory array. The direct memory access address control is also comprised of a pair of dual 4 bit binary counters designated by the numerals 412 and 414 and a quad D-flipflop with clear which is designated by the numeral 416.

A 60 Hz sync circuit, which is generally designated by the numeral 62, is provided to derive a universal clock signal from the 60 Hz AC current signal. This circuit includes an input terminal 420 for obtaining an AC power signal from the power distribution network. This signal is then filtered and amplified with this circuit by means of a DC amplifier 422 and its associated circuitry comprising capacitors 424 and 426 and resistors 428, 430, 432, 434 and 436.

Figure 7B:
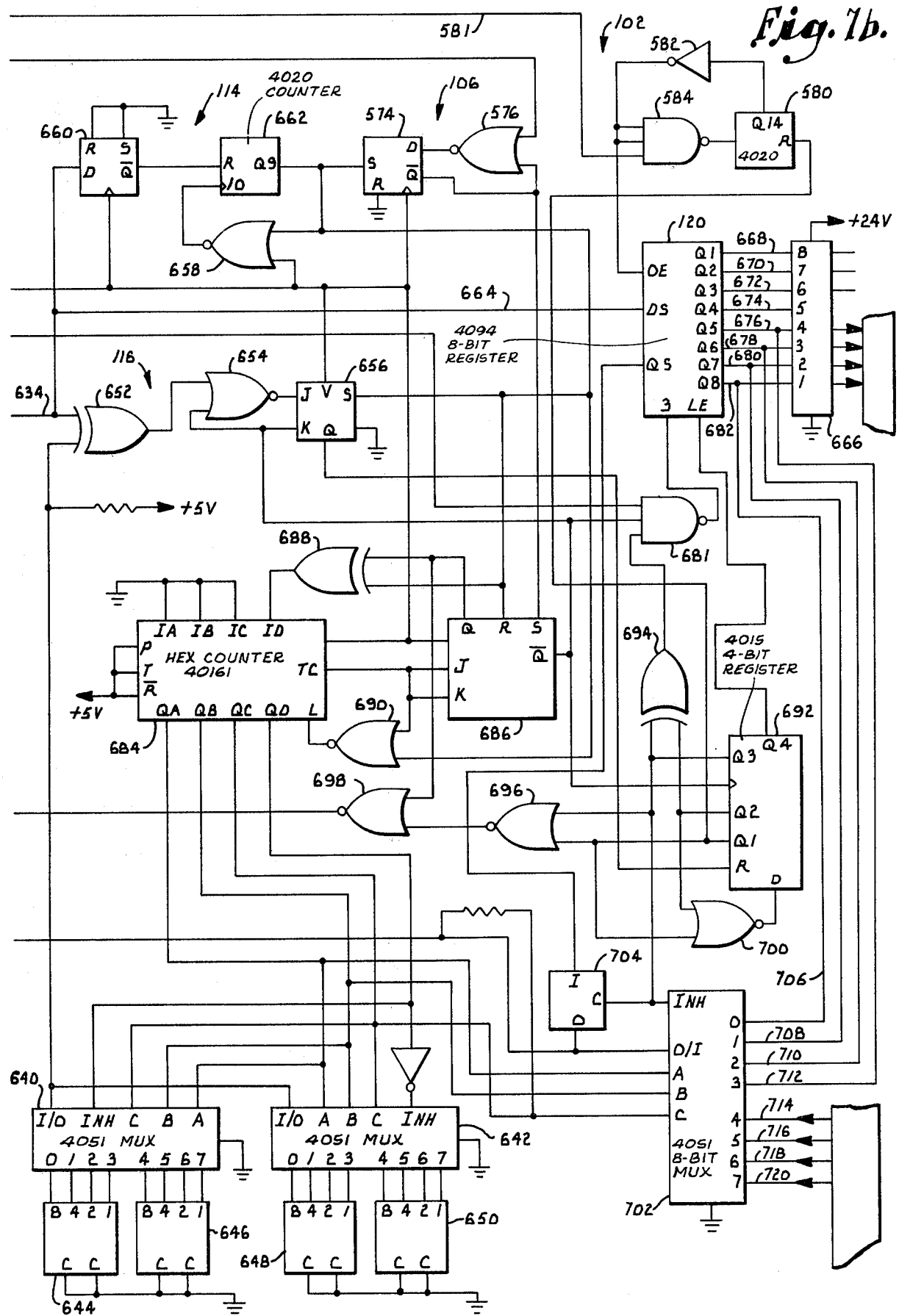

Referring now to FIGS. 7a and 7b, these figures when properly combined provide a detailed schematic diagram of the room control unit. As shown in these figures, each room control unit is equipped with a transformer 500 which operates in combination with a bridge rectifier circuit 502 to produce the power signals needed to run the operable components of the room control unit. The primary coil 504 of transformer 500 is electrically coupled with the hot and neutral lines of the power distribution network by means of conductor lines 506 and 508 respectively. The secondary coil 510 of this transformer, on the other hand, is electrically coupled with the full-wave rectifier 502 which is comprised of diodes 512, 514, 516 and 518. The rectified voltage is then filtered by capacitor 520 before being provided to output terminal 522 as a 24 volt power signal. A 5 volt power signal is provided at output terminal 524. This power signal is derived by transistor 526 operating in conjunction with capacitor 528.

The 360 Hz timing signal used to drive the operable components of the room control unit is derived from the 60 Hz AC power signal present on the hot line of the power distribution network by means of the 60 Hz squaring amplifier and filter circuit which is generally designated by the numeral 100 and the phase-locked loop and clock circuit which is generally designated by the numeral 104. The 60 Hz squaring amplifier and filter network serves to filter and square the AC power signal removed from the hot line of the power distribution network by means of a conductor line 544. The removed power signal is initially fed through an input dampening resistor 534 before being provided to a filter network 535 which is comprised of a pair of resistors 536 and 538 and a pair of capacitors 540 and 542. The 60 Hz squaring amplifier and filter network also includes an operational amplifier 545 which is comprised of a DC amplifier 546 and a plurality of resistors 548, 550 and 551. This operational amplifier is arranged to act as a limiter which is capable of producing a 60 Hz square ware suitable for use as a clock signal.

The phase-locked and clock circuit, on the other hand, is constructed out of a phase-locked loop device 552 which is interconnected with an external counting circuit 554, and a low pass filter 556 to form a closed frequency feedback loop. The phase-locked loop device 552 is formed by an integrated circuit manufactured by Motorola Semiconductor Products, Inc. and is identified by the manufacturer's number MC14046B. This circuit includes two phase comparators having common signal inputs at input pins 3 and 14 and a voltage controlled oscillator (VCO) having a control input at input pin 9.

One of the phase comparators incorporated into this device is designated phase comparator 1 and is comprised of an Exclusive Orgate. The other phase comparator is designated phase comparator 2 and is comprised of a leading edge sensing logic circuit which is capable of providing at output pin 13 a digital error signal having a voltage related to the frequency and phase difference between the signals provided to this phase comparator via input pins 3 and 14. The voltage controlled oscillator (VCO) which is incorporated into this device, is operable to produce at output pin VCO an output signal having a frequency determined by the voltage of the control signal provided to input pin 9 and the value of capacitor 564 and resistors 560 and 562. Resistors 560 and 562 are connected across output pins R1 and R2 of the phase-locked loop device through an analog which 558.

Counting circuit 554 is comprised of a four bit static shift register having a serial data input at input pin D and a parallel output comprising output pins Q2, Q3 and Q4. The four stages of this shift register are constructed of type D master-slave flipflops which are arranged to shift data from one stage to the next in response to a positive going clock transistion. A logic gate 566 is used to electrically couple output pins Q2, Q3 and Q4 with input pin D.

Low pass filter 556 is electrically coupled across output pin 13 and input pin 9 of the phase-locked loop device 552 and is operable to filter the digital error signal before it is used to control the output of the VCO. This low pass filter is comprised of a capacitor 568 and a pair of resistors 570 and 572.

The phase-locked loop shown in FIG. 7 is arranged to act as a frequency multiplier. In particular, this circuit takes the 60 Hz clock signal produced by the 60 Hz squaring amplifier and filter circuit and multiplies the frequency of this signal by a factor determined by the count state of the counting circuit 554. The 60 Hz square wave, which is produced by the 60 Hz squaring amplifier and fitter circuit, is provided to input pin 14 of the phase-locked loop device 552 and serves as one input to phase comparator 2. The other input to this phase comparator is received at input pin 3 and is produced by the counting circuit 554 at output pin Q4. This phase comparator compares the frequency and phase of the signals provided to input pins 3 and 14 and produces at output pin 13 a digital error signal having a voltage related to the frequency and phase difference between these two signals. The digital error signal is then filtered by low pass filter 556 before being returned to input pin 9 of the phase-locked loop device 552. The filtered error signal provided to input pin 9 controls the frequency of the signal produced by the voltage controlled oscillator of the phase-locked loop device. In particular, the frequency of this signal is varied so as to reduce the frequency and phase difference between the signals provided to input pins 3 and 14. The output signal produced by the voltage controlled oscillator is provided at the VCO output pin and comprises the 360 Hz timing signal used to drive the operable components of the room control unit. The clock input of counting circuit 554 is electrically coupled with the VCO output pin and derives from this timing signal the signal provided to input pin 3 of the phase-locked loop circuit 552. As a result, phase comparator 2, low pass filter 556, the voltage controlled oscillator (VCO), and the counting circuit 554 are arranged to form a closed frequency feedback loop which is capable of frequency multiplying the 60 Hz square wave produced by the 60 Hz squaring amplifier and filter circuit to thereby generate at the VCO output pin a 360 Hz timing signal. This 360 Hz signal will be substantially identical in all transceivers regardless of the particular incoming 60 Hz phase that is used since it is based on the 6th harmonic of the power distribution system.

A phase error detector circuit, which is generally designated by the numeral 106, is provided to monitor the phase relationship between the 360 Hz timing signal produced by the phase-locked loop and clock circuit and the 60 Hz square wave produced by the 60 Hz squaring amplifier and filter circuit. The phase error detector circuit is comprised of a type D flipflop 574 and a logic gate 576. One input of this logic gate is electrically coupled with output pin 1 of the phase-locked loop circuit 552 by means of an invertor 578. The other input to this logic gate is derived from the $\overline{Q}$ output of flipflop 574.

The 60 Hz square wave produced by the 60 Hz squaring amplifier and filter circuit is also provided to timer 102 by means of a conductor line 581. Timer 102 is comprised of a 14 bit binary counter 580 and a pair of logic gates 582 and 584.

The room control unit is equipped with a receiver 110 to detect the interrogation signals transmitted by the central processing unit over the neutral line of the power distribution network. Receiver 110 is a two stage device which is operable to amplify and filter the received interrogation signals. The first stage of the receiver includes a filter network 589 which is comprised of inductors 586 and 588 and capacitors 590 and 592. These circuits elements are arranged to provide a band pass filter having a three-DB Chebyshev response with peaks at the transmission frequencies. A resistor 594 and a pair of diodes 596 and 598 are provided to protect the receiver from large transmission signals. The first stage of the receiver is also equipped with an operational amplifier 600 which is comprised of DC amplifier 602 and associated circuit elements 604, 606, 608, 610, 612, 614, 616, and 618. The second stage of the receiver includes another LC filter 620 which is comprised of inductors 622 and 624 and a pair of capacitors 626 and 628. The filter formed by these circuit elements is similar in design and operation to the LC filter employed in the first stage of the receiver. The second stage of the receiver is also equipped with a DC amplifier 630 for further amplification of the interrogation signal.

The received interrogation signal is decoded in discriminator circuit 112. Discriminator circuit 112 is comprised of a 14 bit binary counter which is clocked by the received interrogation signal. The reset input of this circuit is electrically coupled with the VCO output of the phase-locked loop through an inverter 632. The output at (Q7) associated with the seventh stage of this binary counter is the integrated received data and is electrically coupled with the address detector 116 by means of a conductor line 634 and with the sync detector 114 by means of conductor lines 634 and 638.

The address detector circuit is operable to compare the address of the received interrogation signal with an address previously programmed into the room control unit by means of the address encoder which is comprised of a pair of analog multiplexer/demultiplexer devices 640 and 642 and a plurality of switches 644, 646, 648, and 650. These analog multiplexer/demultiplexer devices are digitally controlled analog switches which effectively implement an eight poll single throw electronic switch. The address detector, on the other hand, is comprised of an Exclusive Or gate 652, a NOR 654 and a JK flipflop 656.

The sync detector circuit 114 is operable to search the decoded data for a synchronization signal. This circuit is comprised of a type D flipflop 660, a 14 bit binary counter 662 and a logic gate 658. One input of this logic gate is arranged to accept the 360 Hz timing signal provided at the VCO output pin of the phase-locked loop device 552. The other input to this logic gate is electrically coupled as the output pin Q9 of mounting circuit 662. The Q9 output of this counting circuit is the output pin associated with the ninth stage of this counting circuit.

The data generated by discriminator 112 is also provided to the receiver register 120 by means of conductor lines 634, 638 and 664. The receiver register is an eight stage shift-and-store bus register which is manufactured by RCA and is identified by manufacturer's part number DC4094B. This circuit includes an eight stage serial shift register, an eight bit storage register and eight parallel output terminals (Q1–Q8). These eight output terminals (Q1–Q8) are electrically coupled with the 8 inputs (1–8) of a driver circuit 666 by means of conductor lines 668, 670, 672, 674, 676, 678, 680 and 682 constructed of a Darlington transistor array which is comprised of eight NPN Darlington transistor pairs. A logic gate 681 is provided to control the application of clock signals to input pin 3 of the receiver register.

The bit counter, which is generally designated by the numeral 118, is used to designate the address and data portions of the interrogation signals. This circuit is comprised of a synchronous programmable four bit binary counter 684, a JK flipflop 686 and a pair of logic gates 688 and 690.

Storage of the data within the receiver register is controlled by the dual four bit static shift register 692 and its associates logic gates 694, 696, 698 and 780 which are interconnected to form the previously mentioned state counter.

Assembly and transmission of the return signal is performed within the data multiplexer 128 which is comprised of an eight channel analog multiplexer 702 and an analog switch 704. The eight channel analog multiplexer is constructed out of an analog multiplexer/demultiplexer device which is manufactured by Motorola Semiconductor Products, Inc. and is identified by the manufacturer's Part Number MC14051C. The night channel data multiplexer is equipped with eight input terminals. Four of these terminals (0–3) are electrically coupled with four of the output terminals (Q5–Q8) of the receiver register by means of conductor lines 706, 708, 710 and 712. The other four input terminals (4–7) are arranged to accept data from various external sources by means of conductor lines 714, 716, 718 and 720.

The data signal which is produced by the data multiplexer is sent to the oscillator encoder 126 by means of conductor line 722. The oscillator encoder is comprised of an inductor 724, a pair of analog switches 726 and 728, a plurality of inverters 730, 732 and 734, a pair of resistors 736 and 738, and a plurality of capacitors 740, 742 and 744. The frequency signals from the oscillator encoder are then provided to the output transmitter 138 by means of a conductor line 746. The output transmitter is comprised of a plurality of switching transistors 748, 750, 752 and 754 and associated biasing elements 756, 758, 760 and 762. The transmitter is electrically coupled with the neutral line of the power distribution network through an LC filter network 764 comprised of inductor 766 and capacitor 718.

In operation, the AC power line communications system of the present invention is capable of receiving data from the room control units and from peripheral data terminals. The AC power line communications system is also capable of correlating the data stored within its memory array with the data stored in the memory unit of a room status indicating system with which the system is being used.

While any one of a number of conventional input/output devices could be used to perform the data transfers employed by this system, the AC power line communications system described herein is equipped with some additional circuitry to make it compatible with a conventional room status indicating systems such as the one described in the patent to Kabat et al, U.S. Pat. No. 3,810,096, which is incorporated by reference herein.

Referring now to FIGS. 3 and 6a, b, c, d, e and f, the party line interface circuit 48 and the direct memory access address control 54 are responsible for correlating the operation of the memory array 44 in the AC power line communications system with the memory unit 32 (FIG. 1) in the room status indicating system. In the preferred embodiment of the invention, the central processing unit is arranged to perform data transfers between the memory array and external equipment during phase 1 clock signals and to perform data transfers between the microprocessor and the memory array during phase 2 clock signals.

To accomodate both of these transfer functions, address signals from the direct memory access address control 54 are multiplexed with address signals from the microprocessor 200.

The dynamic ram memories 290, 292, 294, 296, 298, 300, 203 and 304, which are used in this system, require twelve bits of addressing information to designate a storage location. This addressing information is provided to these memory elements over a data bus comprised of six data lines and is multiplexed two for one through the dual four input multiplexers 314, 316, 318, and 320. As a result, the address signal is strobed into the memory elements by two successive six bit address words. The strobing of data into these memory elements is controlled by a column address strobe ($\overline{CAS}$) provided at output pin 10 of monostable multivibrator 336, a row address strobe ($\overline{RAS}$) produced at output pin 6 of monostable multivibrator 334, a write signal ($\overline{W}$) produced at output pin 9 of the dual four input multiplexer 314 and a chip select signal ($\overline{CS}$) produced at output pin 7 of the same multiplexer 314. The column address strobe ($\overline{CAS}$) and the row address strobe ($\overline{RAS}$) are used to respectively designate the rows and columns into which the memory elements are arranged. The write signal ($\overline{W}$), on the other hand controls the inputting and outputting of data from the memory elements. Finally, the presence of a chip select signal ($\overline{CS}$) is operable to disable the memory elements. The transfer of data from the output pins of the memory elements to the data bus and to the direct memory access address circuitry is controlled by the octual tri-state buffer element 332.

During the phase one timing signals, the party line interface circuitry cooperates with the direct memory access address control circuitry to alternately read requested data out of the memory array and to provide data to the memory array. In other words, this circuitry cooperates to output data from the memory array during every other clock period of the phase one timing signal. This information is outputted from the central processing unit coincident with the generation of data from the memory unit 36 (FIG. 1) of the room status indicating system. During the other clock periods, the party line interface circuitry operates in conjunction with the direct memory access address control circuitry to receive data from the peripheral data terminals associated with the room status indicating system. In this way, the central processing unit is capable of outputting stored data in sync with the data from the memory unit 36 (FIG. 1) of the room status indicating system and of receiving new data from the peripheral data terminals during successive periods of the phase one timing cycle.

The party line interface circuitry is responsible for converting the data received from the data terminals into a form suitable for use within the central processing unit and vice-versa. The direct memory access address control, on the other hand, is responsible for providing the received data to the proper storage location and for retrieving data from storage upon request.

The polling function performed by the central processing unit is defined by the flow chart shown in FIG. 9. A copy of the software program used to perform this polling function is provided in Appendix A which is attached hereto. As shown by this flow chart, the central processing unit enters this software routine upon receiving a reset command or an interrupt command. Upon entering this routine, the microprocessor performs an initialize stack step which consists of fixing the return stack within the random access memory. The microprocessor then synchronizes all of the room control units by transmitting a long synchronization signal which is approximately one second in duration and is composed of all data "ones" followed by a single data "zero". Following this synchronization step, the central processing unit removes from memory the address code pertaining to the first room to be interrogated and the data associated with this room. Once this information has been obtained from memory, the microprocessor initiates a receive routine. The receive routine includes the steps of assembling the address code and expected (prediction) return signal from the room control unit into an interrogation signal and transmitting this signal to all of the room control units in the system over the building's power distribution network. The receive routine is completed upon receipt of a return signal from the interrogated room control unit and comparison of this signal to the expected data.

Referring now to FIGS. 6a, b, c, d and e, the assembled interrogation signal is initially provided to the interface unit 12. The interface unit responds to the interrogation signal by causing the transmitter 58 to transmit over the power distribution network another signal having a frequency determined by the logic value of the corresponding bit of the interrogation signal. In particular, the interface unit provides to input pins 4 and 12 of flipflop 216 a control signal which is representative of the logic state of the present bit of the interrogation signal. Flipflop 216 responds to this control signal by placing the transmitter circuitry in condition to transmit an output signal and by presetting one of two preselected count states into counter circuit 214. Counter circuit 214 cooperates with the Exclusive OR gate 225 and one stage of flipflop 215 to produce at output pin Q5 of flipflop 215 a square wave having a frequency determined by the count state preset into counter circuit 214. Counting circuit 214 is a programmable up counter which is capable of dividing the 2 MHz clock signal provided to input pin 2 of this circuit by any whole number from one to sixteen. By using this counting circuit in combination with the Exclusive OR gate 225 and flipflop 215 the counting range of this circuit is increased by a factor of two making this combination of elements capable of dividing the incoming clock signal by any even number from two to thirty-two. It is contemplated that counter circuit 214 will be preset to a high count in response to a control signal representative of a logic "one". The counting circuitry comprised of counting circuit 214, Exclusive OR gate 225 and flipflop 215 is operable to divide the incoming clock signal by a low number in response to counting circuit 214 (a presettable up counter) being preset to an initial High count state. As a result, the counting circuitry cooperates to provide at output pin Q5 of flipflop 215 a source wave having a High frequency. Flipflop 216, however, responds to a control signal representative of a logic level "zero" by presetting the count state of counting circuit 214 to a lower value. By presetting the initial count state of counting circuit 214 to this lower value, the counting circuitry comprised of counting circuit 214, Exclusive OR gate 225, and flipflop 215 cooperate to provide at output pin Q5 of flipflop 215 a square wave having a frequency of lower value. In this way, the frequency of the square wave generated at output pin Q5 of flipflop 215 is directly related to the logic state of the corresponding bit of the interrogation signal.

The square wave produced at output pin Q5 of flipflop 215 is used to drive the push/pull transmitter comprised of coupling transformer 236 and switching transistors 232 and 234. This signal provided to the base terminal of switching transistor 232 through logic gate 224 and to the base terminal of switching transistor to 234 by means of inverter 228 and logic gate 226. Logic gates 224 and 226 serve to amplify the square wave produced at output pin Q5 of flipflop 215 before applying this signal to the base terminals of switching transistors 323 and 234. The oscillating nature of this square wave causes these switching transistors to alternatley switch from a cut-off condition to a saturated condition with the conditions of each of these transistors by controlled by the amplitude of the signal provided to their base terminals. Invertor 228 insures that each of these switching transistors is in different conditions whenever the transmitter is activated. In other words, switching transistor 232 is always in a cutoff condition when switching transistor 234 is in a saturated condition and vice-versa. The output signal produced by the push/pull transmitter is then introduced to the neutral line of the power distribution network at 242 through a filter network 241.

Referring now to FIGS. 7a and 7b, the transmitted interrogation signal is detected with the room control unit by the receiver 110. Receiver 110 is a two stage device which is arranged to pass the preselected transmission frequencies. The transmitted interrogation signal is initially filtered in the first stage of the receiver by means of the LC filter 589. This filter is a band pass filter having a chebyshev response with peaks at the transmission frequencies. The filtered signal is then amplified in the comparator circuit 600 which is operable to limit the amplitude of the amplified signal to a constant value to thereby produce a square wave having a frequency related to the frequency of the received signal. The first stage of the receiver is also equipped with an input dampening resistor 594 and a pair of diodes 596 and 598 to protect the operating components of the room control unit from a large signal on the power distribution network. These diodes are connected in parallel such that each one is conductive in a different direction. This arrangement of the diodes makes them operable to clamp the incoming signal to a set voltage which is within a safe operating range for the associated receiver circuitry.

The output of this first stage is again filtered in another LC filter which is comprised of inductors 622 and 624 and capacitors 626 and 628. These circuit elements are arranged to form a filter which is similar in design and operation to the LC filter 589 which is employed within the first stage of the receiver. A second DC amplifier 630 is provided to further amplify and limit the received interrogation signal before providing it to the discriminator circuit 112 where FM detection is performed.

The discriminator circuit is comprised of a counting circuit which uses the 360 Hz clock signal produced by the phase-locked loop and clock circuit 104 to decode the received interrogation signal. In particular, this circuit is a 14 stage binary counter having its clock input electrically coupled with the receiver 110 and its reset input electronically coupled with the VCO output of the phase lock-loop clock circuit to accept clock pulses therefrom. This circuit is operable to count the number of zero crossings produced by the received interrogation signal between clock pulses to thereby determine the frequency of the interrogation signal during each clock period. Since the frequency of the interrogation signal between clock periods is representative of the logic state of that bit of the interrogation signal, this circuit is operable to determine the logic state of the interrogation signal by measuring the frequency of the received interrogation between each clock period. For example, reception of a signal having a high frequency causes this counting circuit to reach a count state sufficient to provide a signal at output pin Q7 before being reset by the next clock pulse from the phase-locked loop and clock circuit 104. A low frequency signal, however, does not have a frequency high enough to produce an output at Q7 before reception of the next clock pulse from the phase-locked loop and clock avant 104. As a result, the logic state of the signal provided at output pin Q7 is representative of the frequency of the received interrogation signal during that clock period and of the logic state of the corresponding bit of the received interrogation signal.

The data generated by the frequency discriminator is simultaneously provided to the sync detector circuit 114 which searches for a synchronization signal from the central processing unit, the address detector circuit 116 which compares the address portion of the interrogation signal with an address previously programmed into the room control unit by means of switches 644, 646, 648 and 650 and multiplexers 640 and 642, and to receiver register 120 which stores the data provided to the room control unit from the central processing unit.

The sync detector circuit continuously reaches for the presence of a synchronization signal from the central processing unit. The decoded data is provided to the D input of flipflop 660. The presence of a logic level "one" at this input of the flipflop causes the flipflop to output a logic level "zero" at its $\overline{Q}$ output. This output of flipflop 660 is electrically coupled with the reset input of counting circuit 662. Accordingly, the counting circuit 662 is allowed to count clock pulses provided to input pin 10 as long as the logic signal provided to the reset input pin is a logic level "zero". A synchronization signal contains enough logic level "ones" to allow counter 662 to obtain a preselected count state. Upon obtaining this count state, the counter circuit outputs a sync detect signal at output pin Q9. This sync detect signal is provided to one input of logic gate 658 and is operable to disable the clock signal being provided to input pin 10 of the counting circuit to thereby maintain the counter in its present count state. The final bit of the synchronization signal is a logic level "zero". Application of a logic level "zero" to the D input of flip flop 660 causes the $\overline{Q}$ output of this flipflop to change to a positive logic value upon receipt of the next clock pulse. Application of a positive logic signal to the reset input of counting circuit 662 causes this circuit to be reset thereby removing the sync detect signal from output pin Q9 of this counting circuit.

The presence of a sync detect signal at output pin Q9 causes the bit counter to be maintained in a count state of zero. The sync detect signal is provided directly to the reset input of flipflop 686 causing this flipflop to be maintained in a reset condition as long as a sync detect is present at this input terminal. The sync detect signal is also provided to the load input of counting circuit 684 by means of logic gate 690. The application of a sync detect signal to the load input of this counting circuit through logic gate 690 causes this counting circuit to be maintained in a reset condition.

Upon removal of the sync detect signal, the bit counter is allowed to initiate its counting operation. This circuit establishes the time periods during which the address and data portions of the interrogation signal is to be received. In particular, the bit counter is operable to continuously designate the address time period during which the sixteen bits of the address code are capable of being received by the room control unit and the data time period during which the eight bits of data are capable of being received.

During the address time period, the address code, which is programmed into the room control unit by means of electronic switches 644, 646, 648 and 650 and multiplexers 640 and 642 is serially provided to the address detector circuit 116 for comparison with the address code of the received interrogation signal. The bits of the programmed address code are serially provided to one input of Exclusive OR gate 652. The other input of this logic gate is electrically coupled with the output of the discriminator circuit 112. If the bits provided to each input of this exclusive OR gate are of the same logic state, output pin Q of flipflop 656 is maintained in a low logic state. A difference in these two signals, however, causes the signal provided at output pin Q to flipflop 656 to be changed to a positive logic signal upon receipt of the next clock pulse from the phase-locked loop and clock circuit 104. If all of the bits of the programmed address code coincide with the bits of the received address code, output pin Q of flipflop 656 is maintained in a low logic state during the entire address time period. The presence of a low level logic signal at output pin Q of flipflop 656 coincident with the completion of the address time period causes counting circuit 692 to assume a count state of one. Assumption of this count state by the counting circuit 692 indicates to the other circuitry in the room control unit that this unit has just been interrogated by the room control unit. It should be noted, however, that the reception of an interrogation signal having an address code which does not coincide with the address code programmed into the room control unit causes the Q output of flipflop 656 to obtain a positive logic state some time during the address time period. This positive logic signal is provided to the reset input of counting circuit 702 and is operable to maintain this counting circuit in a reset condition. As a result, this counting circuit is maintained in a zero count state upon completion of the address time period indicating to the other circuitry within this room control unit that this unit was not interrogated by the last interrogation signal.

Upon being interrogated by the central processing unit, the room control unit transmits a return signal to the central processing unit. This return signal is an eight bit signal which is capable of transmitting eight independent data messages. Four of these data bits are used to transmit four of the bits of information stored in receiver register 120 and provided at output terminals Q5-Q8. The other four bits of the return signal are used to transmit information accumulated by the room control unit from external sources via inputs 714, 716, 718 and 720. The data from these two sources are assembled into an eight bit data word by means of the analog multiplexer 702. This data word is serially provided to the oscillator encoder circuit 140 where the bits of the data word are mended into a transmitter control signal which is capable of driving the transmitter 142 to transmit a return signal to the central processing unit over the building's power distribution network. In particular, the oscillator encoder circuit produces a transmitter control signal having a frequency determined by the corresponding bit of the data word. The transmitter control signal is then provided to the base terminals of switching transistors 752 and 754 through transistors 748 and 750 respectively. The oscillating nature of the transmitter control signal causes switching transistors 752 and 754 to alternately switch between a saturated state and a cut-off state with each of these switching transistors always sizing in a different state because of different operating nature of these transistors (NPN vs. PNP). In this way, these switching transistors alternately switch between an external voltage of +24 volts and system ground to introduce a large level signal into the neutral line of the power distribution network through an LC network comprised of inductor 766 and capacitor 768. The unique design of this transmitter makes it operable to present a high input impedance to the neutral line of the power distribution network whenever the transmitter is inactive.

In addition to causing a return signal to be transmitted, the assumption of a count state of one by the counting circuit 692 also causes timer 102 to be reset. Thereafter, counting circuit 580 is allowed to initiate its counting sequence to establish a time period of a set duration.

Upon receiving a second interrogation signal having an address code representation of a particular room control unit without the receipt of an intervening interrogation signal having an address code representative of a different room control unit, the count state of counting circuit 692 is incremented a second time. The room control unit responds to this second interrogation by transmitting a second return signal. This second return signal contains the same data that was transmitted by the first return signal and is assembled, encoded and transmitted as described above.

The count state of counting circuit 692 is incremented a third time in response to the reception of a third interrogation signal having an address code representative of a particular room control unit without the reception of an intervening interrogation signal having an address code representative of a different room control unit. The room control unit responds to this third interrogation by causing the data transmitted by this interrogation signal to be temporarily stored within receiver register 120. This data is contained within the information portion of the interrogation signal and is decoded by the discriminator circuit 112 before being provided to the receiver register 120 by means of conductor lines 634, 638 and 664.

The room control unit also responds to the next interrogation by transmitting to the central processing unit a return signal comprising the eight bits of data just received by the room control unit from the central processing unit. Counting circuit 692 provides at output pin Q3 a logic signal whenever its count state has been incremented three times. This logic signal is simultaneously provided to the control input (C) of analog switch 704, to one input of logic gate 694 and to the inhibit input (INH) of analog multiplexer 702. Application of this logic signal to the inhibit input pin (INH) of multiplexer 702 causes this device to be disabled. Reception of this signal by the analog switch 702, on the other hand, causes this device to switch from a normally open state to a closed state wherein input pin I is electrically coupled with output pin O. Finally, this logic signal causes logic gate 694 to be enabled which in turn enables logic gate 681 to thereby allow clock pulses to be provided to input pin 3 of the receiver register 120. As a result, this logic signal is capable of providing a clock signal to the receiver register, of inhibiting the operation of multiplexer 702, and of activating switch 704. The receiver register responds to the clock signal being provided to it by serially providing at output pin Q5 the data temporarily stored data. This data is provided through the analog switch 704 of the oscillator encoder circuit for transmission to the central processing unit.

The room control unit responds to a fourth consecutive interrogation signal by causing the data which is being temporarily stored within receiver register 120 to be permanently stored therein. The room control unit also causes another return signal, which is comprised of four bits of the newly stored data and four bits of the data accumulated by the room control unit from external sources, to be transmitted to the central processing unit.

The reception of any additional interrogation signals having address codes representative of this room control without the reception of any intervening interrogation signals having address codes representative of a different room control unit causes this room control unit to respond by transmitting a return signal comprising four bits of the stored data from the central processing unit and four bits of the data accumulated by the room control unit from external sources.

Once counting circuit 502 reaches its maximum count state, timer circuit 102 provides an output enable signal to input pin OE of receiver register 120. The receiver register responds to this signal by providing at output terminals Q1–Q8 the eight bits of data permanently stored in this circuit. These data bits are amplified in driver circuit 666 before being used to perform various functions within the room or area in which the room control unit is placed.

Reference is now made to FIG. 9 for a more complete description of the polling function performed by the central processing unit. Upon receiving a return signal from the interrogated room control unit, the microprocessor performs a quality check on the received data to determine if the received data represents a valid response from the interrogated unit. If the microprocessor determines that the received data is not a valid response, it initially checks to see how many times this room control unit has been interrogated. If this room control unit has been interrogated a set number of times, the microprocessor indicates that this room is out of order and then enters an idle cycle wherein it is capable of communicating with external processing equipment to determine if this equipment has noted this out-of-order indication. The microprocessor then returns to the set up next remote step and continues its polling function. The microprocessor, however, causes a synchronization signal to be transmitted if this room control unit has not been interrogated the required number of times. Following transmission of this synchronization signal, the microprocessor re-enters the receive routine.

If, on the other hand, the received data is found to be a valid response, the microprocessor checks this data against the data which was retrieved from its associated memory array. Coincidence between this data causes the microprocessor to return to the set up next remote step wherein the address code and data associated with the next room control unit to be polled is retrieved from memory, upon obtaining this information from storage, the microprocessor continues its polling function as described above.

If the received data does not coincide with the stored data, the microprocessor temporarily stores the received data as represented by the block labelled "Buffer Data". The microprocessor then enters the idle and receive again routine wherein the microprocessor transmits a dummy interrogation signal followed by the previously assembled interrogation signal. The microprocessor then waits for a second return signal from the room control unit being interrogated. Upon receiving this return signal, the microprocessor compares the data contained in this signal with the data retrieved from storage. The microprocessor responds to coincidence between this data by returning to the setup next remote step and continuing its polling operation.

If, on the other hand, the received data does not coincide with the stored data, the microprocessor causes a comparison between the data received during the first interrogation and the data received during the second interrogation to be made. A lack of coincidence between this data causes the microprocessor to determine if this room control unit is generating data errors. If this room control unit has already been interrogated a set number of times, the microprocessor generates an out-of-order signal and then enters an idle cycle wherein the microprocessor communicates with external processing equipment to determine if this out-of-order condition has been noted by the associated room status equipment. The microprocessor then continues its polling function by returning to the set-up-next-remote step. If less than a predetermined number of error cycles have been counted, the microprocessor causes a synchronization signal to be transmitted. Following transmission of this synchronization signal, the microprocessor re-enters the receive routine.

Coincidence between the data transmitted to the central processing unit by the first return signal and the data transmitted by the second return signal, however, indicates to the microprocessor that new data has been introduced into the system. Upon making this determination, the microprocessor compares the stored input data with the received input data. The phrase "input data" is used herein to refer to the data accumulated by the room control unit from various external sources. If the microprocessor notes a discrepancy in this data, it updates the stored room status data.

The microprocessor then compares the stored output data with the received output data to determine if the output data stored within the room control unit needs to be updated. The phase "output data" as used herein, refers to the data initially provided to the room control unit by the central processing unit over the power distribution network. If the stored output data coincides with the output data received from the room control unit, the microprocessor initiates an idle cycle and then returns to the set-up-next-remote step. The microprocessor, however, causes another interrogation signal containing the eight bits of output data stored in its associated memory array to be transmitted to the room control unit if the stored output data does not coincide with the received output data. Following transmission of this interrogation signal, the microprocessor waits for a return signal containing the eight bits of data just transmitted to the room control unit to be received. Upon receipt of this return signal, the room control unit compares the eight bits of data contained in this return signal with the eight bits of data transmitted to the room control unit by the previous interrogation signal. If this data does not coincide, the microprocessor checks to see how many times this room control unit has been interrogated and activates an out-of-order signal if this room control unit has already been interrogated a preselected number of times. Following an idle cycle, the microprocessor continues its polling function by returning to the setup next remote step. If, on the other hand, this room control unit has not been interrogated the prescribed number of times, the microprocessor causes a synchronization signal to be transmitted and then returns to the receive routine.

If the eight bits of data contained in the third return signal coincide with the eight bits of data transmitted to the room control unit by the last interrogation signal, the microprocessor preceeds to the receive new data routine wherein two more interrogation signals are transmitted to the room control unit. The microprocessor compares the data transmitted by the two return signals corresponding to these interrogation signals and continues its polling function if these two comparisons indicate that the new output data has been properly stored within the room control unit. A discrepency in the stored data and the received data, however, forces the microprocessor to determine how many times this room control unit has been interrogated upon making this determination, the microprocessor either provides an out-of-order indication or transmits a synchronization signal depending upon the number of times this room control unit has been interrogated. Following transmission of a synchronization signal, the microprocessor returns to the receive routine in order to interrogate the room control unit another time. The microprocessor, however, enters an idle cycle followed by the setup next remote steps if an out-of-order signal has been generated. In the setup next remote step, the microprocessor retrieves from storage the address code and data a-sociated with the next room control unit to be polled. Upon obtaining this information from storage, the microprocessor continues its polling function as described above.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in accompanying drawings is to be interpreted as illustrative and not in a limiting sense.

Having thus described the invention, I claim:

1. A two way data transmission communication system for effecting two way transmission of data on an AC power line which has interferring noise thereon and which is located within a building or building complex comprising:

a plurality of transceivers each of which is located in a different room or area of said building or building complex and connected to said AC power line for transmitting data between the transceivers each of said transceivers having a transmit mode and a receive mode during the operation thereof, each of said transceivers further having:

(1) a receiver means for detecting address signals transmitted over the neutral and ground of the AC power line associated with said building or building complex;

(2) means for accumulating data from various external sources;

(3) transmitter means for transmitting a return signal over the neutral and ground of said AC power line, said return signal being representative of the data accumulated by said transceiver;

(4) means for initiating transmission of said return signal upon receipt of a preselected address signal, said system further including a central processing unit having means for selectively polling each of said transceivers by transmitting over the neutral and ground of said AC power line an address signal which is representative of the transceiver being polled, receiver means for detecting return signals transmitted over the neutral and ground of said AC power line; and means for processing said return signals.

2. The system as in claim 1 wherein the transmitter means associated with each of said transceivers is comprised of a tri-state switching device having three independent switch states comprising a first switch state wherein said tri-state switching device presents a high impedance to the neutral line of said AC power line, a second switch state wherein said tri-state switching device couples a first voltage with the neutral line of said AC power line, and a third switch state wherein said tri-state switching device couples a second voltage with the neutral line of said AC power line, said tri-state switching device being operable to assume one of these three switch states in response to the condition of a transmitter control signal provided to it, and means for generating said transmitter control signal from the data accumulated by said transceiver.

3. The invention as in claim 2 wherein said system includes a filtering means for coupling said second voltage to said neutral line.

4. The system as in claim 3 wherein said filter means is a series resonant filter.

5. The system as in claim 2 wherein said tri-state switching device is comprised of an NPN switching transistor and a PNP switching transistor, each switching transistor having its collector terminal electrically coupled with the neutral line of said AC power line and its base terminal arranged to accept said transmitter control signal, said PNP switching transistor having its emitter terminal electrically coupled with a first voltage, and said NPN switching transistor having its emitter terminal electrically coupled with a second voltage, said first voltage being of a higher voltage than said second voltage.

6. The system as in claim 2 wherein said means for generating said transmitter control signal from the data accumulated by said transceiver is comprised of means for producing a frequency modulate output signal having a frequency representative of the data accumulated by said transceiver.

7. The system as in claim 1 wherein said central processing unit includes means for transmitting a synchronization signal over the neutral and ground of said AC power line.

8. The system as in claim 7 wherein each of said transceivers includes means for synchronizing the operation of each of said transceivers with the operation of said central processing unit such that each of said transceivers is in condition to receive address signals only during the time period during which said central processing unit is actually transmitting address signals.

9. The system as in claim 8 wherein said synchronizing means is comprised of
means for deriving a clocking signal from a 60 Hz AC power signal normally present on said AC power line, said clocking signal having an established phase relationship with said 60 HZ AC power signal,
means for detecting the transmission of a synchronization signal by said central processing unit over the neutral and ground of said AC power line, said detecting means being operable to produce a disabling signal as long as a synchronization signal is being received from said central processing unit, and
counting means for periodically establishing a time period during which said transceiver is in condition to receive address signals, said counting means being operable to maintain a reset condition in response to said disabling signal.

10. The system as in claim 1 wherein the processing means associated with said central processing unit is comprised of means for storing the data contained in said return signals and means for correlating said retrieving data from said storing means to thereby provide a display of said data.

11. The system as in claim 1 wherein the processing means associated with said central processing unit is comprised of
memory means for storing the data provided to said central processing unit by said return signals, said memory means being operable to selectively store and retrieve data pertaining to each of said transceivers,
means for comparing the data provided to said central processing unit by a first return signal from a first transceiver with the stored data pertaining to said first transceiver,
means for initiating the transmission of an address signal which is representative of a second transceiver if the data provided to said central processing unit by said first return signal coincides with the stored data pertaining to said first transceiver,
means for initiating the transmission of an address signal which is representative of said first transceiver if the data provided to said central processing unit by said first return signal does not coincide with the stored data pertaining to said first transceiver,
means for comparing the data provided to said central processing unit by a second return signal from said first transceiver with the stored data pertaining to said first transceiver,
means for initiating the transmission of an address signal representative of a second transceiver if the data provided to said central processing unit by said second return signal coincides with the stored data pertaining to said first transceiver,
means for comparing the data provided to said central processing unit by said first return signal with the data provided to said central processing unit by said second return signal if the data transmitted to said central processing unit by said second return signal does not coincide with the stored data pertaining to said first transceiver,
means for using the data provided to said central processing unit by one of the two return signals from said first transceiver to update the stored data pertaining to said first transceiver if the data provided to said central processing unit by said first return signal coincides with the data provided to said central processing unit by said second return signal, and
means for initiating the transmission of an address signal which is representative of a second transceiver once the stored data pertaining to said first transceiver has been updated.

12. The system as in claim 11 wherein the processing means associated with said central processing unit includes means for providing an indication that a particular transceiver is not operating properly if the data provided to said central processing unit by two consdective return signals from said particular transceiver does not coincide.

13. The combination system as in claim 1 including means for effecting high impedance at each transceiver input across the neutral and ground of the AC power line during the receive mode.

14. The system as in claim 1 including means for effecting a low impedance at each transceiver input across a neutral and ground of the AC power line during the transmit mode.

15. An AC power line communications system for transmitting digital information to and from separate locations or areas on an AC power line which may have interferring noise thereon and which is located within a building or building complex, said digital information capable of being reliably used upon receipt at many locations, said system comprising:

a central processing unit having
receiving means for accumulating information and memory means for storing information pertaining to a particular location or area;
said central processing unit also including a
transmitting means for transmitting an interrogation signal to said particular location or area over the neutral and ground of an AC power distribution network associated with said location or area, said interrogation signal having an address portion which is representative of said particular location or area and an information portion which is representative of the information pertaining to said particular location or area;
a plurality of transceivers each of which is located in a different location or area, each of said transceivers having
means for receiving interrogation signals transmitted by said central processing unit;
means for transmitting digital information to said central processing unit; and
means for accepting the information portion of a received interrogation signal if the address portion of said received interrogation signal is representative of the particular location or area in which said transceiver is located.

16. The system as in claim 15 wherein each of said transceivers includes a counting means for recording the number of consecutive received interrogation signals having an address portion representative of the particular room or area in which that transceiver is located, said counting means being operable to have its count state incremented a set amount upon receipt of an interrogation signal having an address portion which is representative of the particular location or area in which that transceiver is located and to have its count state reset to a preselected count state upon receipt of an interrogation signal having an address portion which is not representative of the particular location or area in which that transceiver is located and means for causing the data transmitted to said transceiver by the information portion of one of said consecutive interrogation signals to be stored in said memory means in response to said counting means obtaining a preselected count state.

17. The system as in claim 15 wherein each of said transceivers includes means for synchronizing the operation of each of said transceivers with the operation of said central processing unit such that each of said transceivers is in condition to receive interrogation signals only during the time period during which said central processing is actually transmitting interrogation signals.

18. The system as in claim 17 wherein said central processing unit includes means for transmitting a synchronization signal over the neutral and ground of said AC power line.

19. The system as in claim 18 wherein said synchronizing means is comprised of
means for deriving a timing signal from a 60 HZ AC power signal normally present on said AC power line, said timing signal having an established phase relationship with said 60 Hz AC power signal,
means for detecting the transmission of a synchronization signal by said central processing unit over the neutral and ground of said AC power line, siad detecting means being operable to produce a disabling signal as long as a synchronization signal is being received from said central processing unit, and
counting means for periodically establishing a time period during which each of said transceivers is in condition to receive address signals, said counting means being operable to maintain a reset condition in response to said disabling signal.

20. The system as in claim 15 wherein each of said transceivers includes
memory means for storing the data provided to a transceiver by the information portion of an interrogation signal,
counting means for recording the number of consecutive received interrogation signals having an address portion which is representative of the particular location or area in which said transceiver is located, said counting means being arranged to have its count state incremented by a set amount upon receipt of an interrogation signal having an address portion which is representative of the particular location or area in which said transceiver is located to have its count state reset to a preselected count state upon receipt of an interrogation signal having an address portion which is not representative of the particular location or area in which said transceiver is located, and
means for causing the data provided to said transceiver by the information portion of one of said consecutive interrogation signals to be stored in said memory means in response to said counting means obtaining a preselected count state.

21. The system as in claim 20 wherein each of said transceivers includes means for accumulating data from various external sources.

22. The system as in claim 21 wherein each of said transceivers includes transmitting means for transmitting a first return signal over the neutral and ground of said AC power line, said return signal being representative of the data accumulated by a transceiver and of at least a portion of the data stored within said memory means of said transceiver, and means for initiating tranmission of said return signal upon receipt of a interrogation signal having an address portion which is representative of the particular transceiver location or area.

23. The system as in claim 22 wherein the transmitter means associated with each of said transceivers is comprised of a tri-state switching device having three independent switch states comprising a first switch state wherein said tri-state switching device presents a high impedance to the neutral line of said AC power line, a second switch state wherein said tri-state switching device couples a first voltage with the neutral line of said AC power line, and a third switch state wherein said tri-state switching device couples a second voltage with the neutral line of said AC power line, said tri-state switching device being operable to assume one of these three switch states in response to the condition of a transmitter control signal provided to it, and means for generating said transmitter control signal from the data accumulated by said transceiver and from at least a portion of the data stored within said memory means.

24. The system as in claim 23 wherein said tri-state switching device is comprised of an NPN switching transistor and a PNP switching transistor, each switching transistor having its collector terminal electrically coupled with the neutral line of said AC power line and its base terminal electrically coupled with a common input terminal which is arranged to accept said transmitter control signal, said PNP switching transistor having its emitter terminal electrically coupled with a first voltage, and said NPN switching transistor having its emitter terminal electrically coupled with a second voltage, said first voltage being of a higher voltage than said second voltage.

25. The system as in claim 24 wherein said means for generating said transmitter control signal from the data accumulated by said transceiver is comprised of means for producing a frequency modulated output signal having a frequency representative of the data accumulated by said transceiver.

26. The system as in claim 22 wherein said transmitting means of each transceiver will transmit a second return signal, and wherein said central processing unit includes memory means for storing the data provided to said central processing unit by said return signals and by other system data sources, said memory means being operable to selectively store and retrieve data pertaining to each location or area within said locations or areas, means for comparing the data transferred to said central processing unit by said first return signal from a first transceiver with the stored data pertaining to said first transceiver, means for initiating the transmission of an interrogation signal having an address portion representative of a second transceiver if the data provided to said central processing unit by said first return signal coincides with the stored data pertaining to said first transceiver, means for initiating the transmission of an interrogation signal having an address portion representative of said first transceiver if the data provided to said central processing unit by said first return signal does not coincide with the stored data pertaining to said first transceiver, means for comparing the data thereby provided to said central processing unit by said second return signal from said first transceiver with the stored data pertaining to said first transceiver, means for initiating the transmission of an interrogation signal having an address portion representative of a second transceiver if the data provided to said central processing unit by said second return signal coincides with the stored data pertaining to said first transceiver, means for comparing the data provided by said first return signal with the data provided by said second return signal if the data provided to said central processing unit by said second return signal does not coincide with the stored data pertaining to said first transceiver, means for interpreting the difference between the data provided to said central processing unit by said first and second return signals and the stored data pertaining to said first transceiver if the data provided to said central processing unit by said first return signal coincides with the data provided to said central processing unit by said second return signal.

27. The system as in claim 26 wherein said central processing unit includes means for using the data provided to said central processing unit by one of said two return signals to update the stored data pertaining to said first transceiver if the difference in the data provided to said central processing unit by said first and second return signals and the stored data pertaining to said first transceiver is interpreted by said interpreting means as accumulated from said first transceiver, and means for initiating the transmission of an interrogation signal having an address portion representative of a second transceiver once the stored data pertaining to said first transceiver has been updated.

28. The system as in claim 26 wherein said central processing unit includes means for causing a preselected number of interrogation signals having a address portion representative of said first transceiver to be transmitted consecutively if the difference in the data provided to said central processing unit by said first and second return signals and the stored data pertaining to said first transceiver is interpreted by said interpreting means as requiring transceiver output change by said central processing unit, means for comparing the data provided to said central processing unit by each return signal in response to each of said consecutive interrogation signals with the stored data pertaining to said first transceiver, and means for initiating the transmission of an interrogation signal having an address portion representative of a second transceiver if the data provided to said central processing unit by either of said return signals coincides with the stored data pertaining to said first transceiver.

29. The system as in claim 26 wherein the said central processing unit includes means for providing an indication that a particular transceiver is not operating properly if the data provided to said central processing unit by two consecutive return signals from said particular transceiver does not coincide.

30. The system as in claim 22 wherein said central processing unit includes a memory means for storing data pertaining to each room or area within said preselected group of rooms or areas and means for correlating and retrieving data from said memory means associated with said central processing unit to thereby provide a display of said data.

31. The system as in claim 15 wherein said central processing unit includes means for selectively providing status information to each location or area within said locations or areas in a set sequence.

32. In an AC power line communications system comprising a central processing unit and a plurality of transceivers each of which is located in a different room or area of a building or building complex and is assigned a unique address code, a method for transferring to said central processing unit information accumulated by a particular transceiver, said method comprising the steps of periodically transmitting from said central processing unit an address signal which is representative of the address code assigned to said particular transceiver on the neutral and ground of the AC power line associated with said building or building complex, transmitting from said particular transceiver a return signal on the neutral and ground of the AC power line associated with said building or building complex upon receipt of said address signal by said particular transceiver, and receiving said return signal at said central processing unit.

33. The method as in claim 32 wherein said transmitting step of said transceiver comprises the steps of receiving said address signal at said particular transceiver, deriving an address code from the received address signal, comparing the derived address code with the address code assigned to said particular transceiver, and initiating transmission of said return signal if the derived address code coincides with the address code assigned to said particular transceiver.

34. In an AC power line communications system which is exposed to noise, said system comprising a plurality of transceivers each of which is located in a different room or area in a building or building complex, each of said transceivers being operable to accumulate data from various external sources and being assigned a unique address code, and a central processing unit having a memory means for storing the data accumulated by each of said transceivers, a method for updating the stored data pertaining to a particular transceiver, said method comprising the steps of transmitting from said central processing unit an address signal which is representative of the address code assigned to said particular transceiver on the AC power line associated with said building or building complex;

transmitting from said particular transceiver a first return signal on the neutral and ground of the AC power line associated with said building or building complex upon receipt of said address signal by said particular transceiver, said return signal being representative of the data accumulated by said particular transceiver, comparing in said central processing unit the data provided to said central processing unit by said first return signal with the stored data pertaining to said particular transceiver, and transmitting from said central processing unit a succession of address signals which is representative of the address code assigned to said particular transceiver over the AC power line associated with said building or building complex if said comparing step yields a preselected difference.

35. The method as in claim 34 including the steps of transmitting from said particular transceiver a second return signal on the neutral and ground of the AC power line associated with said building or building complex upon receipt of a second address signal by said particular transceiver, said second return signal being representative of the data accumulated by said particular transceiver, comparing in said central processing unit the data provided to said central processing unit by said second return signal with the stored data pertaining to said particular transceiver, comparing the data provided to said central processing by said first return signal with the data provided to said central processing unit by said second return signal if the data provided to said central processing unit by said second return signal does not coincide with the stored data pertaining to said particular transceiver, and using the data provided to said central processing unit by one of the two return signals from said particular transceiver to update the stored data pertaining to said particular transceiver if the data provided to said central processing unit by said first return signal coincides with the data provided to said central processing unit by said second return signal.

* * * * *